US012185079B2

(12) United States Patent
Herre et al.

(10) Patent No.: US 12,185,079 B2
(45) Date of Patent: Dec. 31, 2024

(54) APPARATUS AND METHOD FOR SYNTHESIZING A SPATIALLY EXTENDED SOUND SOURCE USING CUE INFORMATION ITEMS

(71) Applicant: Fraunhofer-Gesellschaft zur Förderung der angewandten Forschung e.V., Munich (DE)

(72) Inventors: Jürgen Herre, Erlangen (DE); Alexander Adami, Erlangen (DE); Carlotta Anemüller, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 175 days.

(21) Appl. No.: 17/929,893

(22) Filed: Sep. 6, 2022

(65) Prior Publication Data

US 2022/0417694 A1 Dec. 29, 2022

Related U.S. Application Data

(63) Continuation of application No. PCT/EP2021/056358, filed on Mar. 12, 2021.

(30) Foreign Application Priority Data

Mar. 13, 2020 (EP) .................................... 20163159

(51) Int. Cl.
*H04R 5/00* (2006.01)
*H04S 7/00* (2006.01)

(52) U.S. Cl.
CPC .......... *H04S 7/302* (2013.01); *H04S 2400/01* (2013.01); *H04S 2420/01* (2013.01)

(58) Field of Classification Search
CPC ... H04S 7/302; H04S 2400/01; H04S 2420/01
(Continued)

(56) References Cited

U.S. PATENT DOCUMENTS 8,437,868 B2 5/2013 Spille et al.
8,488,796 B2 7/2013 Jot et al.
(Continued)

FOREIGN PATENT DOCUMENTS

EP 3 090 573 A1 11/2016
KR 10-2017-0125660 A 11/2017
(Continued)

OTHER PUBLICATIONS

Russian language office action dated Apr. 20, 2023, issued in application No. RU 2022126526.
(Continued)

*Primary Examiner* — Ammar T Hamid
(74) *Attorney, Agent, or Firm* — McClure, Qualey & Rodack, LLP

(57) ABSTRACT

An apparatus for synthesizing a spatially extended sound source includes: a spatial information interface for receiving a spatial range indication indicating a limited spatial range for the spatially extended sound source within a maximum spatial range; a cue information provider for providing one or more cue information items in response to the limited spatial range; and an audio processor for processing an audio signal representing the spatially extended sound source using the one or more cue information items.

20 Claims, 18 Drawing Sheets

(58) Field of Classification Search
USPC ..................................................... 381/17, 18
See application file for complete search history.

(56) References Cited

U.S. PATENT DOCUMENTS

| | | | | |
|---|---|---|---|---|
| 2017/0094440 | A1 | 3/2017 | Brown et al. | |
| 2017/0325045 | A1* | 11/2017 | Baek | H04S 1/002 |
| 2018/0077514 | A1 | 3/2018 | Lee | |
| 2019/0020968 | A1 | 1/2019 | Suenaga et al. | |

FOREIGN PATENT DOCUMENTS

| | | | |
|---|---|---|---|
| RU | 2 523 215 | C2 | 7/2014 |
| RU | 2 602 346 | C2 | 11/2016 |
| RU | 2 698 775 | C1 | 8/2019 |
| WO | 2004/036548 | A1 | 4/2004 |
| WO | 2010/017967 | A1 | 2/2010 |
| WO | 2014/036085 | A1 | 3/2014 |
| WO | 2015/102920 | A1 | 7/2015 |
| WO | 2015/156654 | A1 | 10/2015 |
| WO | 2020/127329 | A1 | 6/2020 |

OTHER PUBLICATIONS

English language translation of office action dated Apr. 20, 2023 (pp. 1-4 of attachment).

Russian language office action dated May 10, 2023, issued in application No. RU 2022126514.

English language translation of office action dated May 10, 2023 (pp. 1-6 of attachment).

International Search Report and Written Opinion issued in application No. PCT/EP2021/056358.

Blauert, J.; "Spatial Hearing: Psychophysics of Human Sound Localization;" 3rd ed. Cambridge, Mass: MIT Press; 2001; pp. 1-86.

Lauridsen, H.; "Experiments Concerning Different Kinds of Room-Acoustics Recording;" Ingenioren; 1954; pp. 906-910.

Kendall, G.S.; "The Decorrelation of Audio Signals and Its Impact on Spatial Imagery;" Computer Music Journal; vol. 19; No. 4; 1995; pp. 71-87.

Faller, C., et al.; "Binaural cue coding—Part II: Schemes and applications;" IEEE Transactions on Speech and Audio Processing; vol. 11; No. 6; Nov. 2003; pp. 520-531.

Baumgarte, F., et al; "Binaural cue coding—Part I: Psychoacoustic fundamentals and design principles;" IEEE Transactions on Speech and Audio Processing; vol. 11; No. 6; Nov. 2003; pp. 509-519.

Zotter, F., et al.; "Efficient Phantom Source Widening;" Archives of Acoustics; vol. 38; No. 1; 2013; pp. 27-37.

Alary, B., et al.; "Velvet-noise decorrelator," Proceedings of the 20th International Conference on Digital Audio Effects (DAFx-17); Sep. 2017; pp. 405-411.

Schlecht, S.J., et al.; "Optimized velvet-noise decorrelator;" Proceedings of the 21th International Conference on Digital Audio Effects (DAFx-18); Sep. 2018; pp. 1-8.

Pulkki, V.; "Uniform spreading of amplitude panned virtual sources;" Proceedings of the 1999 IEEE Workshop on Applications of Signal Processing to Audio and Acoustics; Oct. 1999; pp. 187-190.

Pulkki, V.; "Virtual Sound Source Positioning Using Vector Base Amplitude Panning;" Journal of the Audio Engineering Society; vol. 45; No. 6; Jun. 1997; pp. 456-466.

Pulkki, V., et al.; "Efficient Spatial Sound Synthesis for Virtual Worlds;" Audio Engineering Society, International Conference; Feb. 2009; pp. 1-10.

Pulkki, V.; "Spatial Sound Reproduction with Directional Audio Coding;" Journal of the Audio Engineering Society; vol. 55; No. 6; Jun. 2007; pp. 503-516.

Pihlajamäki, T., et al.; "Synthesis of Spatially Extended Virtual Source with Time-Frequency Decomposition of Mono Signals;" Journal of the Audio Engineering Society; vol. 62; No. 7/8; Aug. 2014; pp. 467-484.

Verron, C., et al.; "A 3-D Immersive Synthesizer for Environmental Sounds;" IEEE Transactions on Audio, Speech, and Language Processing; vol. 18; No. 6; Aug. 2010; pp. 1550-1561.

Potard, G., et al.; "A study on sound source apparent shape and wideness;" Proceedings of the 2003 International Conference on Auditory Display; Jul. 2003; pp. 6-9.

Potard, G., et al.; "Decorrelation techniques for the rendering of apparent sound source width in 3D audio displays;" Decorrelation techniques for the rendering of apparent sound source width in 3D audio displays, Jan. 2004, pp. 280-284; Oct. 2004; pp. 280-284.

Schmidt, J., et al.; "New and Advanced Features for Audio Presentation in the MPEG-4 Standard;" Audio Engineering Society, Convention Paper 6058; May 2004; pp. 1-13.

Schmele, T., et al.; "Controlling the Apparent Source Size in Ambisonics Using Decorrelation Filters;" Audio Engineering Society, Conference Paper; Aug. 2018; pp. 1-7.

Zotter, F., et al.; "Efficient Phantom Source Widening and Diffuseness in Ambisonics;" Proc. of the EAA Joint Symposium on Auralization and Ambisonics; Apr. 2014; pp. 69-74.

Borß, C.; "An Improved Parametric Model for the Design of Virtual Acoustics and its Applications;" Ph.D. Dissertation, Ruhr-Universität Bochum; Jan. 2011; pp. 1-181.

Schissler, C., et al.; "Efficient HRTF-based Spatial Audio for Area and Volumetric Sources;" IEEE Transactions on Visualization and Computer Graphics; vol. 22; No. 4; Apr. 2016; pp. 1356-1366.

Office Action dated Jun. 20, 2024, issued in application No. EP 21710976.8.

* cited by examiner

Spherical SESS

Ellipsoid SESS

Line SESS

Spherical SESS

Piano-Shaped SESS (depicted in green) with an approximative parametric ellipsoid shape (indicated as a red mesh)

Piano-shaped SESS

APPARATUS AND METHOD FOR SYNTHESIZING A SPATIALLY EXTENDED SOUND SOURCE USING CUE INFORMATION ITEMS

CROSS-REFERENCES TO RELATED APPLICATIONS

This application is a continuation of copending International Application No. PCT/EP2021/056358, filed Mar. 12, 2021, which is incorporated herein by reference in its entirety, and additionally claims priority from European Application No. EP 20 163 159.5, filed Mar. 13, 2020, which is incorporated herein by reference in its entirety.

BACKGROUND OF THE INVENTION

The present invention is related to audio signal processing and, particularly, to the reproduction of one or more spatially extended sound sources.

For various applications, reproduction of sound sources over several loudspeakers or headphones is required. These applications include 6-Degrees-of-Freedom (6DoF) virtual, mixed or augmented reality applications. The simplest way to reproduce sound sources over such setups is to render them as point sources. However, when aiming at reproducing physical sound sources with non-negligible auditory spatial extent, this model is not sufficient. Examples for such sound sources are a grand piano, a choir or a waterfall, which all have a certain "size".

Realistic reproduction of sound sources with spatial extent has become the target of many sound reproduction methods. This includes binaural reproduction, using headphones, as well as conventional reproduction, using loudspeaker setups ranging from 2 speakers ("stereo") to many speakers arranged in a horizontal plane ("Surround Sound") and many speakers surrounding the listener in all three dimensions ("3D Audio"). In the following, a description of existing methods is given. The different methods are thereby grouped into methods considering source width in the 2D respectively 3D space.

Methods are described that pertain to rendering SESS on a 2D surface faced from the point of view of a listener. This could for example be in a certain azimuth range at zero degrees of elevation (like it is the case in conventional stereo/Surround Sound) or in certain ranges of azimuth and elevation (like it is the case in 3D Audio or Virtual Reality (VR) with 3-Degrees-of-Freedom (3DoF) of the user movement, i.e. head rotation in pitch/yaw/roll axes).

Increasing the apparent width of an audio object that is panned between two or more loudspeakers (generating a so-called phantom image or phantom source) can be achieved by decreasing the correlation of the participating channel signals [1, p. 241-257].

With decreasing correlation, the phantom source's spread increases, until for correlation values close to zero, it covers the whole range between the loudspeakers. Decorrelated versions of a source signal are obtained by deriving and applying suitable decorrelation filters. Lauridsen [2] proposed to add/subtract a time delayed and scaled version of the source signal to itself in order to obtain two decorrelated versions of the signal. More complex approaches were for example proposed by Kendall [3]. He iteratively derived paired decorrelation all-pass filters based on combinations of random number sequences. Faller et al. propose suitable decorrelation filters ("diffusers") in [4, 5]. Also, Zotter et al. [6] derived filter pairs in which frequency-dependent phase or amplitude differences are used to achieve widening of a phantom source. Alary et al. [7] proposed decorrelation filters based on velvet noise which were further optimized by Schlecht et al. [8].

Besides reducing correlation of the phantom source's corresponding channel signals, source width can also be increased by increasing the number of phantom sources attributed to an audio object. In [9], the source width is controlled by panning the same source signal to (slightly) different directions. The method was originally proposed to stabilize the perceived phantom source spread of VBAP-panned [10] source signals when they are moved in the sound scene. This is advantageous since dependent on a source's direction, a rendered source is reproduced by two or more speakers, which can result in undesired alterations of perceived source width.

Virtual world DirAC [11] is an extension of the traditional Directional Audio Coding (DirAC) [12] approach for sound synthesis in virtual worlds. For rendering spatial extent, directional sound components of a source are randomly panned within a certain range around the source's original direction, where panning directions vary with time and frequency.

A similar approach is pursued in [13], where spatial extent is achieved by randomly distributing frequency bands of a source signal into different spatial directions. This is a method aiming at producing a spatially distributed and enveloping sound coming equally from all directions rather than controlling an exact degree of extent.

Verron et al. achieved spatial extent of a source by not using panned correlated signals, but by synthesizing multiple incoherent versions of the source signal, distributing them uniformly on a circle around the listener, and mixing between them [14]. The number and gain of simultaneously active sources determine the intensity of the widening effect. This method was implemented as a spatial extension to a synthesizer for environmental sounds.

Methods are described that pertain to rendering extended sound sources in 3D space, i.e. in a volumetric way as it is required for VR with 6DoF of the user movement. These 6-Degrees-of-Freedom include head rotation in pitch/yaw/roll axes plus 3 translational movement directions x/y/z.

Potard et al. extended the notion of source extent as a one-dimensional parameter of the source (i.e., its width between two loudspeakers) by studying the perception of source shapes [15]. They generated multiple incoherent point sources by applying (time-varying) decorrelation techniques to the original source signal and then placing the incoherent sources to different spatial locations and by this giving them three-dimensional extent [16].

In MPEG-4 Advanced AudioBIFS [17], volumetric objects/shapes (shuck, box, ellipsoid and cylinder) can be filled with several equally distributed and decorrelated sound sources to evoke three-dimensional source extent.

Recently, Schlecht et al. [18] proposed an approach which projects the convex hull of the SESS geometry towards the listener position, this allows to render the SESS at any relative position to the listener. Similar to MPEG-4 Advanced AudioBIFS, several decorrelated point sources are then placed within this projection.

In order to increase and control source extent using Ambisonics, Schmele et al. [19] proposed a mixture of reducing the Ambisonics order of an input signal, which inherently increases the apparent source width, and distributing decorrelated copies of the source signal around the listening space.

Another approach was introduced by Zotter et al., where they adopted the principle proposed in [6] (i.e., deriving filter pairs that introduce frequency-dependent phase and magnitude differences to achieve source extend in stereo reproduction setups) for Ambisonics [20].

A common disadvantage of panning-based approaches (e.g., [10, 9, 12, 11]) is their dependency on the listener's position. Even a small deviation from the sweet spot causes the spatial image to collapse into the loudspeaker closest to the listener. This drastically limits their application in the context of VR and Augmented Reality (AR) where the listener is supposed to freely move around. Additionally, distributing time-frequency bins in DirAC-based approaches (e.g., [12, 11]) not always guarantees the proper rendering of the spatial extent of phantom sources. Moreover, it typically significantly degrades the source signal's timbre.

Decorrelation of source signals is usually achieved by one of the following methods: i) deriving filter pairs with complementary magnitude (e.g., [2]), or ii) using all-pass filters with constant magnitude but (randomly) scrambled phase (e.g., [3, 16]). Furthermore, widening of a source signal is obtained by spatially randomly distributing time-frequency bins of the source signal (e.g., [13]).

All approaches come with their own implications: Complementary filtering a source signal according to i) typically leads to an altered perceived timbre of the decorrelated signals. While all-pass filtering as in ii) preserves the source signal's timbre, the scrambled phase disrupts the original phase relations and especially for transient signals causes severe dispersion and smearing artifacts. Spatially distributing time-frequency bins proved to be effective for some signals, but also alters the signal's perceived timbre. It showed to be highly signal dependent and introduces severe artifacts for impulsive signals.

Populating volumetric shapes with multiple decorrelated versions of a source signal as proposed in Advanced AudioBIFS ([17, 15, 16]) assumes availability of a large number of filters that produce mutually decorrelated output signals (typically, more than ten point sources per volumetric shape are used). However, finding such filters is not a trivial task and becomes more difficult the more such filters are needed. If the source signals are not fully decorrelated and a listener moves around such a shape, e.g., in a VR scenario, the individual source distances to the listener correspond to different delays of the source signals. Their superposition at the listener's ears will thus result in position dependent comb-filtering, potentially introducing annoying unsteady coloration of the source signal. Furthermore, application of many decorrelation filters means a lot of computational complexity.

Similar considerations apply to the approach described in [18], where a number of decorrelated point sources are placed on the convex hull projection of the SESS geometry. While the authors do not mention anything about the required number of decorrelated auxiliary sources, potentially a large number is needed in order to achieve a convincing source extent. This leads to the drawbacks already discussed in the previous paragraph.

Controlling the source width using the Ambisonics-based technique described in [19] by lowering the Ambisonics order showed to have an audible effect only for transitions from 2nd to 1st or to 0th order. These transitions are not only perceived as a source widening but also frequently as a movement of the phantom source. While adding decorrelated versions of the source signal could help stabilizing the perception of apparent source width, it also introduces comb-filter effects, which alter the phantom source's timbre.

SUMMARY

According to an embodiment, an apparatus for synthesizing a spatially extended sound source may have: a spatial information interface for receiving a spatial range indication indicating a limited spatial range for the spatially extended sound source within a maximum spatial range; a cue information provider for providing one or more cue information items in response to the limited spatial range; and an audio processor for processing an audio signal representing the spatially extended sound source using the one or more cue information items.

According to another embodiment, a method of synthesizing a spatially extended sound source may have the steps of: receiving a spatial range indication indicating a limited spatial range for the spatially extended sound source within a maximum spatial range; providing one or more cue information items in response to the limited spatial range; and processing an audio signal representing the spatially extended sound source using the one or more cue information items.

Another embodiment may have a non-transitory digital storage medium having a computer program stored there-on to perform the method of synthesizing a spatially extended sound source, the method having the steps of: receiving a spatial range indication indicating a limited spatial range for the spatially extended sound source within a maximum spatial range; providing one or more cue information items in response to the limited spatial range; and processing an audio signal representing the spatially extended sound source using the one or more cue information items, when said computer program is run by a computer.

The present invention is based on the finding that a reproduction of a spatially extended sound source can be efficiently achieved by the usage of a spatial range indication indicating a limited spatial target range for a spatially extended sound source within a maximum spatial range. Based on the spatial range indication and, particularly, based on the limited spatial range, one or more cue information items are provided and, a processor processes the audio signal representing the spatially extended sound source using the one or more cue items.

This procedure achieves a highly efficient processing of the spatially extended sound source. For a headphone reproduction, for example, only two binaural channels, i.e., a left binaural channel or a right binaural channel, are required. For a stereo reproduction, only two channels are required as well. Thus, in contrast to synthesizing the spatially extended sound source using a considerable number of peripheral sound sources filling up the actual volume or area of the spatially extended sound source or, generally, filling up the limited spatial range due to their individual placement, this is not required in accordance with the present invention, since the spatially extended sound source is not rendered using a considerable number of individual sound sources placed within the volume, but the spatially extended sound source is rendered using two or, probably, three channels that have certain cues with each other that would be obtained, when the high number of peripheral individual sound sources were received at two or three locations.

Thus, in contrast to different methods that exist and aim at realistically reproducing spatially extended sound sources (SESS), where these existing methods typically require a large number of decorrelated input signals, the present invention goes into a different direction. Generating such decorrelated input signals can be relatively costly in terms of computational complexity. Earlier existing methods may also impair the perceived quality of the sound through timbre differences or timbre smearing. And finding a large number of mutually orthogonal decorrelators is in general not an easy to solve problem. Hence, such earlier procedures result in a trade-off between the degree of mutual decorrelation and introduced signal degradation apart from the high computational resources required.

Contrary thereto, the present invention synthesizes a resulting low number of channels such as the resulting left channel and the resulting right channel for the spatially extended sound source using two decorrelated input signals only. Advantageously, the synthesis result is a left and a right ear signal for a headphone reproduction. However, for other kinds of reproduction scenarios, such as a loudspeaker rendering or an active crosstalk-reduction loudspeaker rendering, the present invention can be applied as well. Instead of placing many different decorrelated sound signals at different places within a volume for a spatially extended sound source, the audio signal for the spatially extended sound source consisting of one or more channels is processed using one or more cue information items derived from a cue information provider in response to a limited spatial range indication received from a spatial information interface.

Embodiments aim at efficiently synthesizing the SESS for headphone reproduction. The synthesis is thereby based on the underlying model of describing an SESS by an (ideally) infinite number of densely spaced decorrelated point sources distributed over the whole source extent range. The desired source extent range can be expressed as a function of azimuth and elevation angle, which makes the inventive method applicable to 3DoF applications. An extension to 6DoF applications however is possible, by continuously projecting the SESS geometry in the direction towards the current listener position as described in [18]. As a specific example, the desired source extent is in the following described in terms of azimuth and elevation angle range.

Further embodiments rely on the usage of an inter-channel correlation value as a cue information or additionally use an inter-channel phase difference, an inter-channel time difference, an inter-level difference and a gain factor or a pair of a first and a second gain factor information item. Hence, the absolute levels of the channels can either be set by two gain factors or a single gain factor and the inter-channel level difference, Any audio filter functions instead of actual cue items or, in addition to actual cue items can also be provided as cue information items from the cue information provider to the audio processor so that the audio processor operates by synthesizing, for example, two output channels such as two binaural output channels or a pair of a left and a right output channel using an application of an actual cue item and, optionally, filtering using a head related transfer function for each channel as a cue information item or using a head related impulse response function as a cue information item or using a binaural or (non-binaural) room impulse response function as a cue information item. Generally, only setting a single cue item may be sufficient, but in more elaborate embodiments, more than one cue item with or without filters may be imposed on the audio signals by the audio processor.

Thus, when, in an embodiment, an inter-channel correlation value is provided as a cue information item, and where the audio signal comprises a first audio channel and the second audio channel for the spatially extended sound source, or where the audio signal comprises a first audio channel and the second audio channel is derived from the first audio channel by a second channel processor implementing, for example, a decorrelation processing or a neural network processing or any other processing for deriving a signal that can be considered as a decorrelated signal, the audio processor is configured to impose a correlation between the first audio channel and the second audio channel using the inter-channel correlation value and either in addition or before or after this processing, audio filter functions can be applied as well in order to finally obtain the two output channels that have the target inter-channel correlation indicated by the inter-channel correlation value and that additionally have the other relations indicated by the individual filter functions or the other actual cue items.

The cue information provider may be implemented a look-up table comprising a memory or as a Gaussian Mixture Model or as a Support Vector Machine or as a vector codebook, a multi-dimensional function fit or some other device efficiently providing the required cues in response to a spatial range indication.

It is possible, for example in the look-up table example, or in the vector codebook or a multi-dimensional function fit example or also in the GMM or SVM example, to already provide pre-knowledge so that the main task of the spatial information interface is to actually find the matched candidate spatial range that matches, among all available candidate spatial ranges, as good as possible with the input spatial range indication information. This information can be provided directly via a user or can be calculated using information on the spatially extended sound source and using a listener position or a listener orientation (as e.g. determined by a head tracker or such a device) by some kind of projection calculation. The geometry or size of the object and the distance between the listener and the object can be sufficient to derive the opening angle, and, thus, the limited spatial range for the rendering of the sound source. In other embodiments, the spatial information interface is just an input for receiving the limited spatial range and for forwarding this data to the cue information provider, when the data received by the interface is already in the format usable by the cue information provider.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
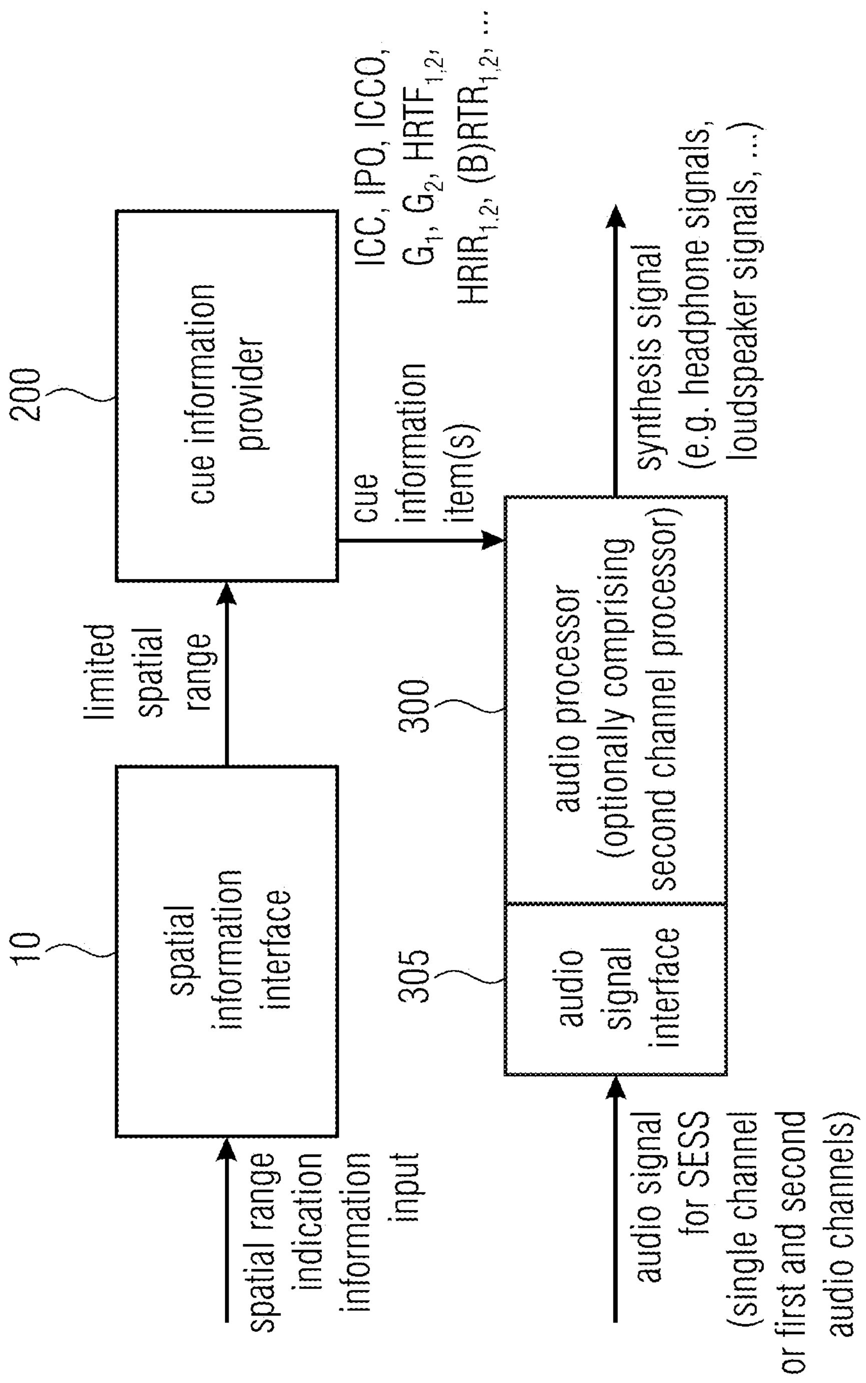
FIG. 1*a* illustrates an implementation of the apparatus for synthesizing the spatially extended sound source.
Figure 2:
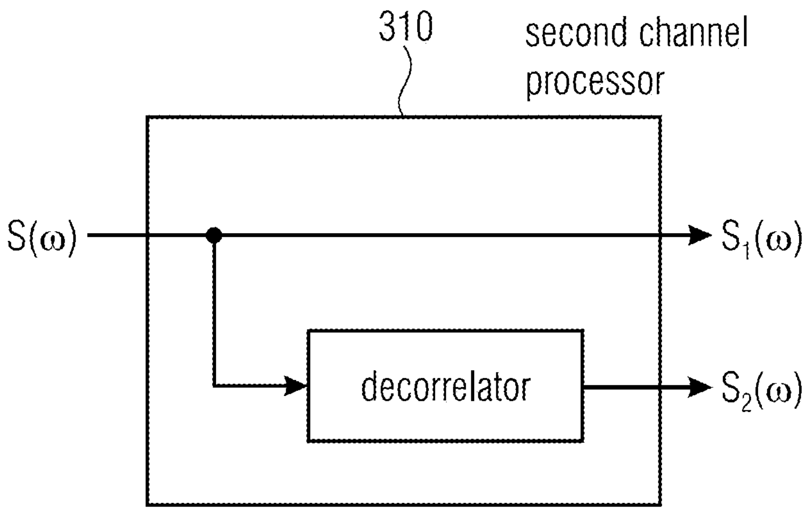
FIG. 2 illustrates a embodiment of a second channel processor included within the audio processor of FIG. 1*a;*

FIG. 1*a* illustrates an implementation of an apparatus for synthesizing a spatially extended sound source. The apparatus comprises a spatial information interface 10 that receives a spatial range indication information input indicating a limited spatial range for the spatially extended sound source within a maximum spatial range. The limited spatial range is input into a cue information provider 200 configured for providing one or more cue information items in response to the limited spatial range given by the spatial information interface 10. The cue information item or the several cue information items are provided to an audio processor 300 configured for processing an audio signal representing the spatially extended sound source using the one or more cue information items provided by the cue information provider 200. The audio signal for the spatially extended sound source (SESS) may be a single channel or may be a first audio channel and a second audio channel or may be more than two audio channels. However, for the purpose of having a low processing load, a small number of channels for the spatially extended sound source or, for the audio signal representing the spatially extended sound source is advantageous. The audio signal is input into an audio signal interface 305 of the audio processor 300 and the audio processor 300 processes the input audio signal received by the audio signal interface or, when the number of input audio channels is smaller than required such as only one, the audio processor comprises a second channel processor 310 illustrated in FIG. 2 comprising, for example, a decorrelator for generating a second audio channel $S_2$ decorrelated from the first audio channel S that is also illustrated in FIG. 2 as $S_1$. The cue information items can be actual cue items such as inter-channel correlation items, inter-channel phase difference items, inter-channel level difference and gain items, gain factor items $G_1$, $G_2$, together representing an inter-channel level difference and/or absolute amplitude or power or energy levels, for example, or the cue information items can also be actual filter functions such as head related transfer functions with a number as required by the actual number of to be synthesized output channels in the synthesis signal. Thus, when the synthesis signal is to have two channels such as two binaural channels or two loudspeaker channels, one head related transfer function for each channel is required. Instead of head related transfer functions, head related impulse response functions (HRIR) or binaural or non-binaural room impulse response functions (B)RIR are necessary. As illustrated in FIG. 1*a*, one such transfer function is required for each channel and FIG. 1*a* illustrates the implementation of having two channels so that the indices indicate “1” and “2”.

In an embodiment, the cue information provider 200 is configured to provide, as a cue information item, an inter-channel correlation value. The audio processor 300 is configured to actually receive, via the audio signal interface 305, a first audio channel and a second audio channel. When, however, the audio signal interface 305 only receives a single channel, the optionally provided second channel processor generates, for example, by means of the procedure in FIG. 2, the second audio channel. The audio processor performs a correlation processing to impose a correlation between the first audio channel and the second audio channel using the inter-channel correlation value.

In addition, or alternatively, a further cue information item can be provided such as an inter-channel phase difference item, an inter-channel time difference item, an inter-channel level difference and a gain item or a first gain factor and a second gain factor information item. The items can also be interaural (IACC) correlation values, i.e., more specific inter-channel correlation values, or interaural phase difference items (IAPD) i.e., more specific inter-channel phase difference values.

In a embodiment, the correlation is imposed by the audio processor 300 in response to the correlation cue information item, before ICPD, ICTD or ICLD adjustments are performed or, before, HRTF or other transfer filter function processings are performed. However, as the case may be, the order can be set differently.

Figure 1B:
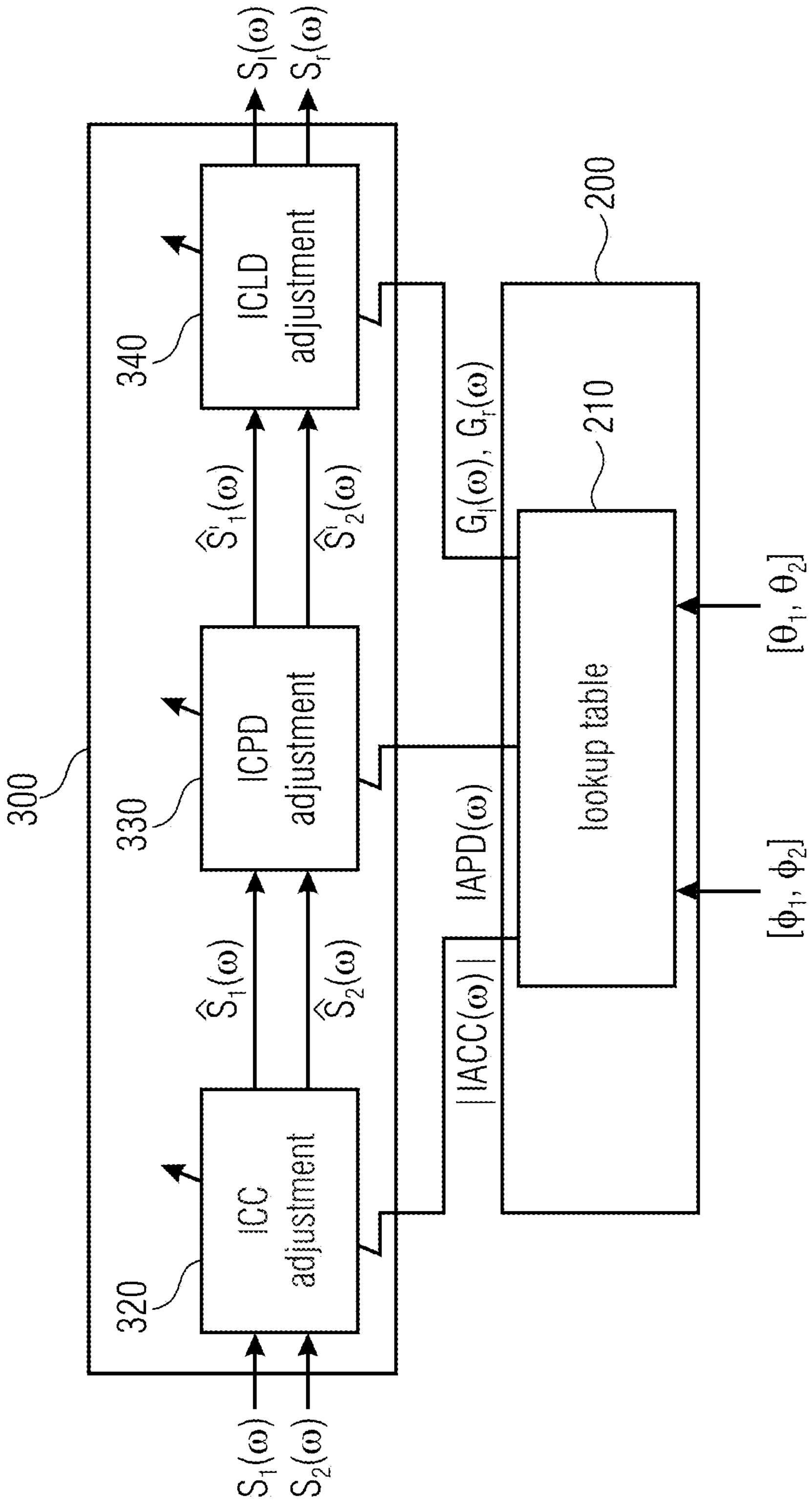
FIG. 1*b* illustrates another embodiment of the audio processor and the cue information provider.

In a embodiment, the audio processor comprises a memory for storing information on different cue information items in relation to different spatial range indications. In this situation, the cue information provider additionally comprises an output interface for retrieving, from the memory, the one or more cue information items associated with the spatial range indication input into the corresponding memory. Such a lookup table 210 is, for example, illustrated in FIG. 1*b*, 4 or 5, where the look-up table comprises a memory and an output interface for outputting the corresponding cue information items. Particularly, the memory may not only store IACC, IAPD or $G_l$ and $G_r$ values as illustrated in FIG. 1*b*, but the memory within the look-up table may also store filter functions as illustrated in block 220 of FIG. 4 and FIG. 5 indicated as “select HRTF”. In this embodiment, although illustrated separately in FIG. 4 and FIG. 5, the blocks 210, 220 may comprise the same memory where, in association with the corresponding spatial range indication indicated as azimuth angles and elevation angles, the corresponding cue information items such as IACC and, optionally, IAPD and transfer functions for filters such as $HRTF_l$ for the left output channel and $HRTF_r$ for the right output channel are stored, where the left and right output channels are indicated as $S_l$ and $S_r$ in FIG. 4 or FIG. 5 or FIG. 1*b*.

The memory used by the look-up table 210 or the select function block 220 may also use storage device where, based on certain sector codes or sector angles or sector angle ranges, the corresponding parameters are available. Alternatively, the memory may store a vector codebook, or a multi-dimensional function fit routine, or a Gaussian Mixture Model (GMM) or a Support Vector Machine (SVM) as the case may be.

Given a desired source extent range, an SESS is synthesized using two decorrelated input signals. These input signals are processed in such away that perceptually important auditory cues are reproduced correctly. This includes the following interaural cues: Interaural Cross Correlation (IACC), Interaural Phase Differences (IAPD)[1] and Interaural Level Differences (IALD). Besides that, monaural spectral cues are reproduced. These are mainly important to sound source localization in the vertical plane. While the IAPD and IALD are mainly important for localization purposes as well, the IACC is known to be a crucial cue to source width perception in the horizontal plane. During runtime, target values of these cues are retrieved from a pre-computed storage. In the following, a look-up table is used for this purpose. However, every other means of storing multi-dimensional data, e.g. a vector codebook or a multi-dimensional function fit, could be used. Apart from the considered source extent range, all cues depend on the used Head-Related Transfer Function (HRTF) data set only. Later on, a derivation of the different auditory cues is given.

In FIG. 1*b*, a general block diagram of the proposed method is shown. $[\Phi_1, \Phi_2]$ describes the desired source extent in terms of azimuth angle range. $[\theta_1, \theta_2]$ is the desired source extent in terms of elevation angle range. $S_1(\omega)$ and $S_2(\omega)$ denote two decorrelated input signals, with w describing the frequency index. For $S_1(\omega)$ and $S_2(\omega)$ thus the following equation holds:

$$E\{S_1(\omega)\cdot S^*_2(\omega)\}=0. \tag{1}$$

Additionally, both input signals are required to have the same power spectral density. As an alternative it is possible to only give one input signal, $S(\omega)$. The second input signal is generated internally using a decorrelator as depicted in FIG. 2. Given $S_l(\omega)$ and $S_r(\omega)$, the extended sound source is synthesized by successively adjusting the Inter-Channel Coherence (ICC), the Inter-Channel Phase Differences (ICPD) and the Inter-Channel Level Differences (ICLD) to match the corresponding interaural cues. The quantities needed for these processing steps are read from the pre-calculated look-up table. The resulting left and right channel signals, $S_l(\omega)$ and $S_r(\omega)$ can be played back via headphones and resemble the SESS. It should be noted that the ICC adjustment has to be performed first, the ICPD and ICLD adjustment blocks however can be interchanged. Instead of the IAPD, the corresponding Interaural Time Differences (IATD) could be reproduced as well. However, in the following only the IAPD is considered further In the ICC adjustment block, the cross-correlation between both input signals is adjusted to a desired value $|IACC(\omega)|$ using the following formulas [21]:

$$\hat{S}_1(\omega) = H_\alpha(\omega)\cdot S_1(\omega) + H_\beta(\omega)\cdot S_2(\omega), \tag{2}$$

$$\hat{S}_2(\omega) = H_\alpha(\omega)\cdot S_2(\omega) + H_\beta(\omega)\cdot S_1(\omega), \tag{3}$$

$$H_\beta(\omega) = H_\alpha(\omega)\sqrt{\frac{1}{2}\left(1-\sqrt{1-|1ACC(\omega)|^2}\right)}, \tag{4}$$

$$H_\alpha(\omega) = \sqrt{1-H_\beta^2(\omega)}. \tag{5}$$

Figure 3:
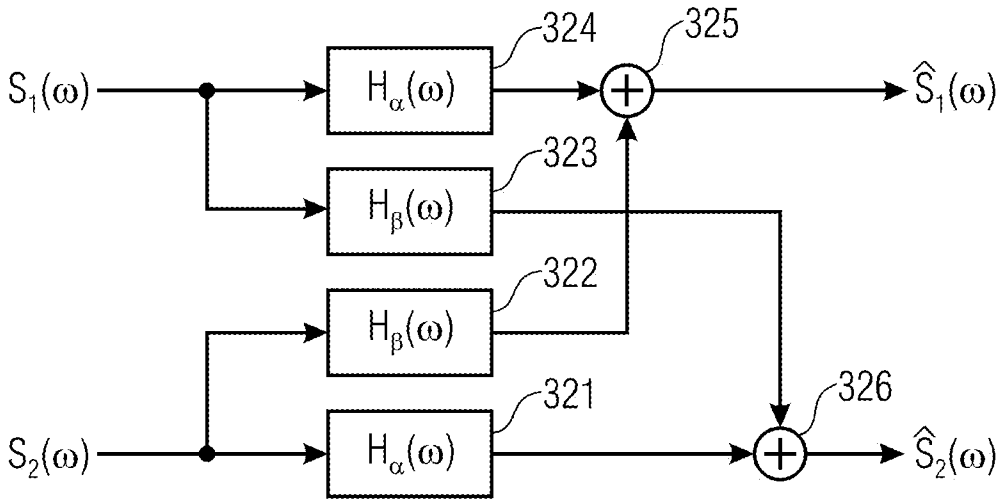
FIG. 3 illustrates an implementation of a device for performing the ICC adjustment.

Applying these formulas results in the desired cross-correlation, as long as the input signals $S_1(\omega)$ and $S_2(\omega)$ are fully decorrelated. Additionally, their power spectral density needs to be identical. The corresponding block diagram is shown in FIG. 3.

The ICPD adjustment block is described by the following formulas:

$$\hat{S}'_1(\omega)=e^{j\cdot IAPD(\omega)}\cdot\hat{S}_1(\omega), \tag{6}$$

$$\hat{S}'_2(\omega)=\hat{S}_2(\omega). \tag{7}$$

Finally, the ICLD adjustment is performed as follows:

$$S_l(\omega)=G_l(\omega)\cdot\hat{S}'_1(\omega), \tag{8}$$

$$S_r(\omega)=G_r(\omega)\cdot\hat{S}'_1(\omega), \tag{9}$$

where $G_1(\omega)$ describes the left ear gain and $G_r(\omega)$ describes the right ear gain. This results in the desired ICLD as long as $\hat{S}'_1(\omega)$ and $\hat{S}'_2(\omega)$ do have the same power spectral density. As left and right ear gain are used directly, monaural spectral cues are reproduced in addition to the IALD.

In order to further simplify the previously discussed method, two options for simplification are described. As mentioned earlier, the main interaural cue influencing the perceived spatial extent (in the horizontal plane) is the IACC. It would thus be conceivable to not use precalculated IAPD and/or IALD values, but adjust those via the HRTF directly. For this purpose, the HRTF corresponding to a position representative of the desired source extent range is used. As this position, the average of the desired azimuth/elevation range is chosen here without loss of generality. In the following, a description of both options is given.

The first option involves using precalculated IACC and IAPD values. The ICLD however is adjusted using the HRTF corresponding to the center of the source extent range.

Figure 4:
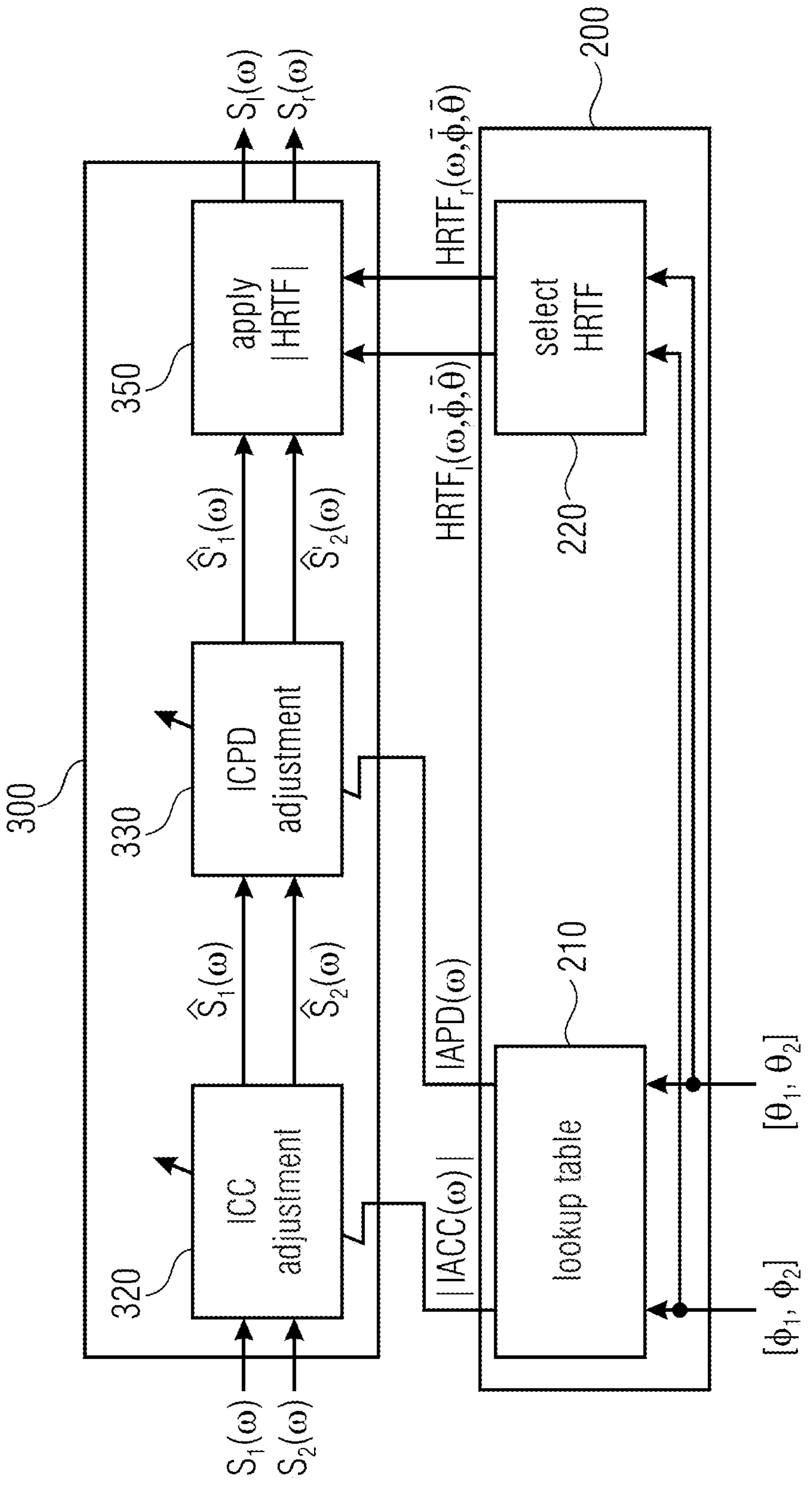
FIG. 4 illustrates a embodiment of the present invention where the cue information items rely on actual cue items and filters.

A block diagram of the first option is shown in FIG. 4. $S_l(\omega)$ and $S_r(\omega)$ are now calculated using the following formulas:

$$S_l(\omega)=\hat{S}'_1(\omega)\cdot|HRTF_l(\omega,\bar{\phi},\bar{\theta})|, \tag{10}$$

$$S_r(\omega)=\hat{S}'_2(\omega)\cdot|HRTF_r(\omega,\bar{\phi},\bar{\theta})|, \tag{11}$$

with $\bar{\phi}=(\phi_1+\phi_2)_2)/2$ and $\bar{\theta}=(\theta_1+\theta_2)/2$ describing the location of an HRTF that represents an average of the desired azimuth/elevation range. The main advantages of the first option include:

- No spectral shaping/coloring when source extent is increased compared to a point source in the center of the source extent range.
- Lower memory requirements compared to the full-blown, as $G_l(\omega)$ and $G_r(\omega)$ do not have to be stored in the look-up table.

More flexible to changes in the HRTF dataset during runtime compared to the full-blown method, as only resulting ICC and ICPD, but not ICLD, depend on the HRTF data set used during pre-calculation.

The main disadvantage of this simplified version is that it will fail whenever drastic changes in the IALD occur, compared to the not extended source. In this case, the IALD will not be reproduced with sufficient accuracy. This is for example the case when the source is not centered around 0° azimuth and at the same time the source extent in horizontal direction becomes too large.

The second option involves using pre-calculated IACC values only. The ICPD and

ICLD are adjusted using the HRTF corresponding to the center of the source extent range.

Figure 5:
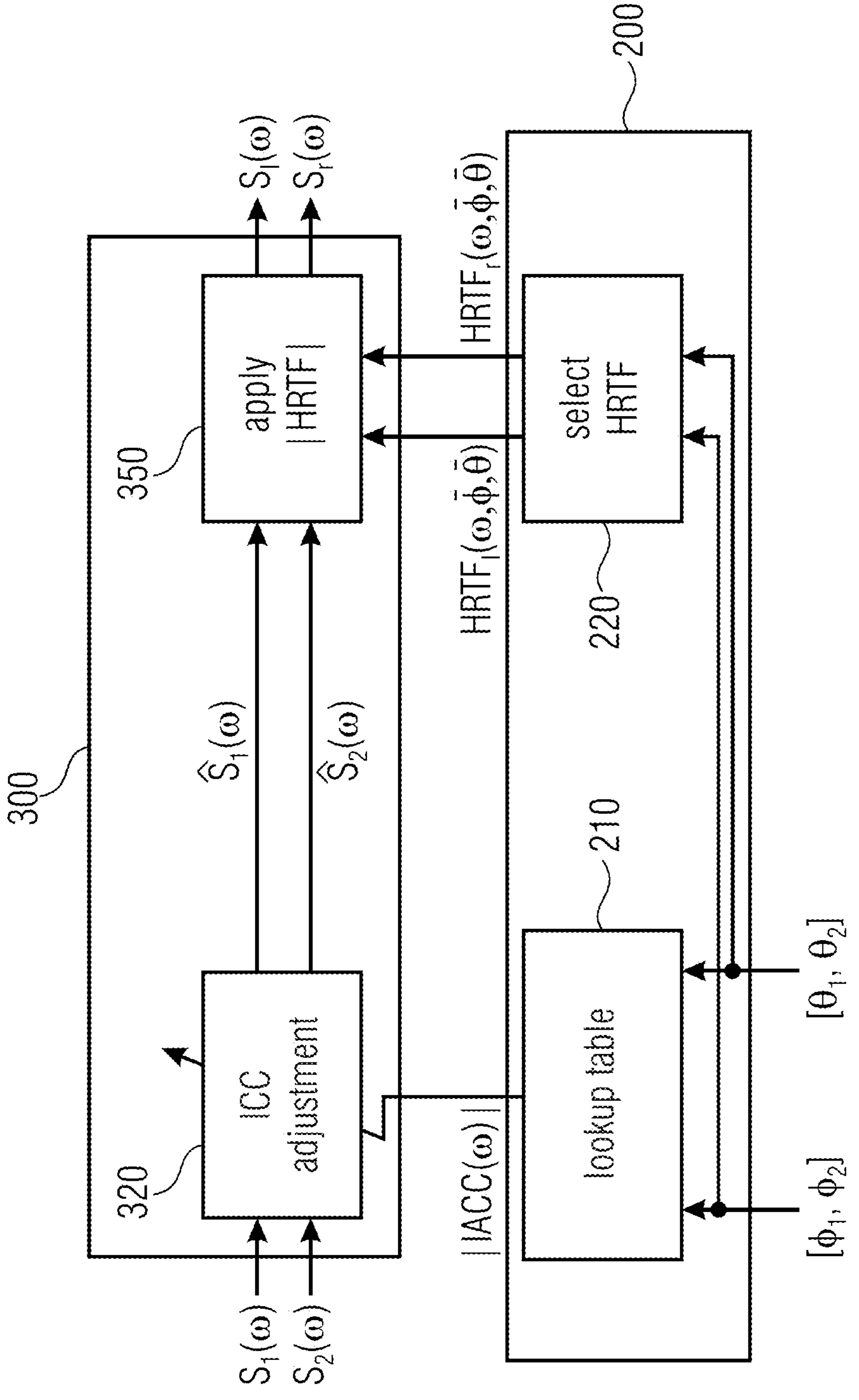
FIG. 5 illustrates another embodiment additionally relying on filters and an inter-channel correlation item.

A block diagram of the second option is shown in FIG. 5. $S_l(\omega)$ and $S_r(\omega)$ are now calculated using the following formulas:

$$S_l(\omega)=\hat{S}_1(\omega)\cdot \mathrm{HRTF}_l(\omega,\bar{\phi},\bar{\theta}), \quad (12)$$

$$S_r(\omega)=\hat{S}_2(\omega)\cdot \mathrm{HRTF}_r(\omega,\bar{\phi},\bar{\theta}). \quad (13)$$

In contrast to the first option, phase and magnitude of the HRTF are now used instead of magnitude only. This allows to not only adjust the ICLD but also the ICPD. The main advantages of the second option include:

- As for the first option, no spectral shaping/coloring occurs when the source extent is increased compared to a point source in the center of the source extent range.
- Even lower memory requirements than for the first option, as neither $G_l(\omega)$ and $G_r(\omega)$ nor IAPD have to be stored in the look-up table.
- Compared to the first option, even more flexible to changes in the HRTF data set during runtime. Only the resulting ICC depends on the HRTF data set used during pre-calculation.
- An efficient integration into existing binaural rendering systems is possible, as simply two different inputs, $\hat{S}_1(\omega)$ and $\hat{S}_2(\omega)$, have to be used for left and right ear signal generation.

As for the first option, this simplified version will fail whenever drastic changes in the IALD occur compared to the not extended source. Additionally, changes in IAPD should not be too big compared to the not extended source. However, as the IAPD of the extended source will be rather close to the IAPD of a point source in the center of the source extent range, the latter is not expected to be a big issue.

Figure 6:
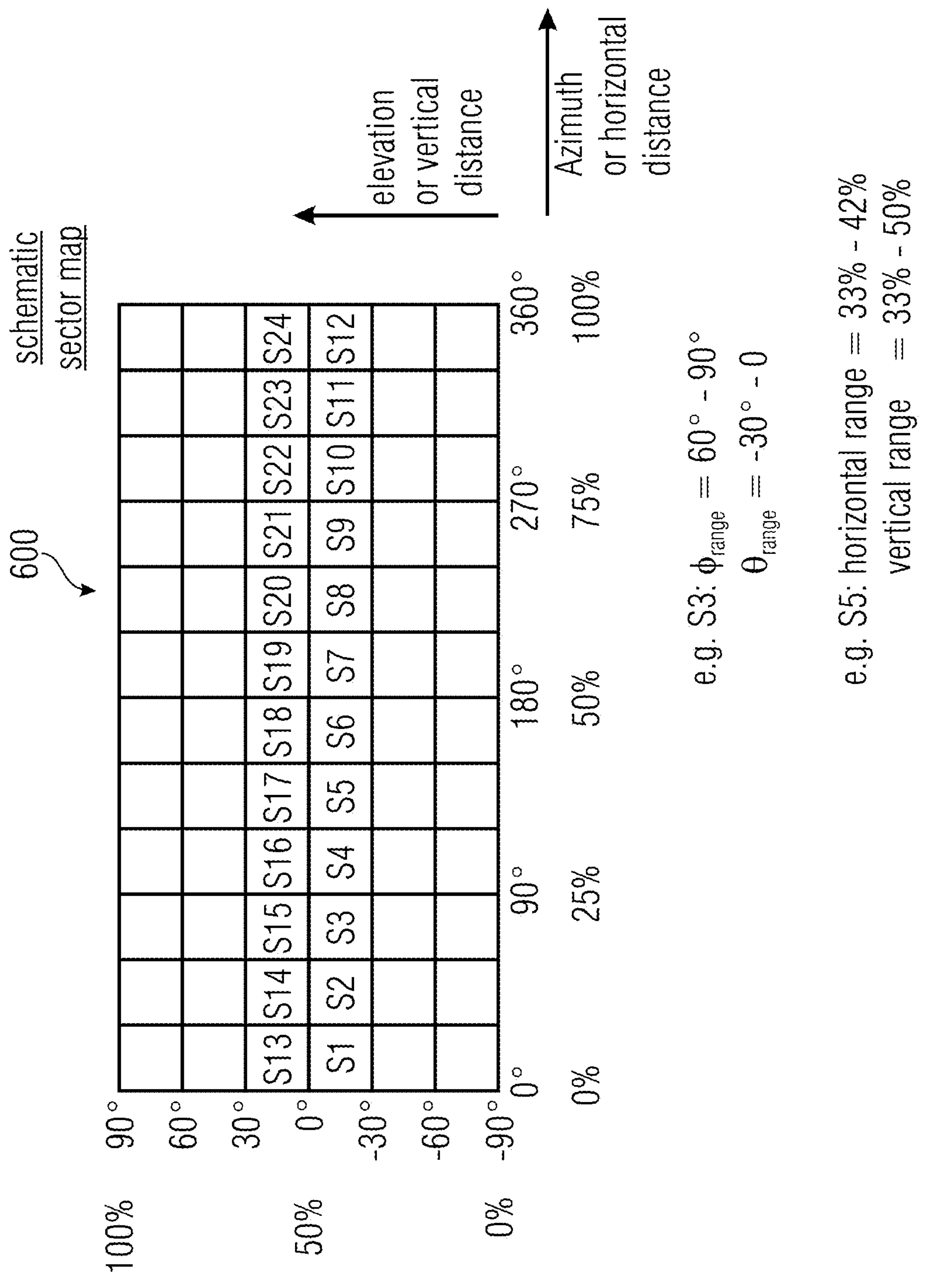
FIG. 6 illustrates a schematic sector map illustrating a maximum spatial range in a two-dimensional or three-dimensional situation and individual sectors or limited spatial ranges that can, for example, be used as candidate sectors.

FIG. 6 illustrates an exemplary schematic sector map. Particularly, a schematic sector map is illustrated at 600 and the schematic sector map 600 illustrates the maximum spatial range. When the schematic sector map is considered to be a two-dimensional illustration of a three-dimensional surface of a sphere, which is intended by showing the azimuth and elevation angle ranges from 0° to 360° for the azimuth angle and from −90° to +90° for the elevation angle, it becomes clear that, when one would wrap the schematic sector map onto a sphere, and one would place the listener position within the center of the sphere, all the individual sectors exemplarily illustrated by some instances, i.e., S1 to S24 can subdivide a whole spherical surface into sectors. Hence, for example, sector S3 extends, with respect to the azimuth angle range from $\phi_1$=60° until $\phi_2$ to 90°, when the notation of FIG. 1*b*, FIG. 4, FIG. 5 is applied. The sector S3 exemplarily extends within the elevation angle range between −30° and 0°.

However, the schematic sector map 600 can also be used when the listener is not placed within the center of the sphere, but is placed at a certain position with respect to the sphere. In such a case, only certain sectors of the sphere are visible, but it is not necessary that for all sectors of the sphere certain cue information items are available. It is only necessary that for some (required) sectors certain cue information items that are advantageously pre-calculated as discussed later on or that are, alternatively, obtained by measurements are available.

Alternatively, the schematic sector map can be seen as a two-dimensional maximum range, where a spatially extended sound source can be located. In such a situation, the horizontal distance extends between 0% and 100% and the vertical distance extends between 0% and 100%. The actual vertical distance or extension and the actual horizontal distance or extension can be mapped, via a certain absolute scaling factor to the absolute distances or extensions. When, for example, the scaling factor is 10 meters, 25% would correspond to 2.5 meters in the horizontal direction. In the vertical direction, the scaling factors can be the same or different from the scaling factor in the horizontal direction. Thus, for the horizontal/vertical distance/extension example, the sector S5 would extend, with respect to the horizontal dimension, between 33% and 42% of the (maximum) scaling factor and the sector S5 would extend, within the vertical range, between 33% and 50% of the vertical scaling factor. Thus, a spherical or non-spherical maximum spatial range can be subdivided into limited spatial ranges or sectors S1 to S24, for example.

In order to adapt the rastering in an efficient way to the human listening perception, it is advantageous to have a low resolution within the vertical or elevation direction and to have a higher resolution within the horizontal or azimuth direction. Exemplarily, one may use only sectors of a sphere that cover the whole elevation range which would mean that only a single line of sectors extending from, for example, S1 to S12 is available as different sectors or limited spatial ranges where the horizontal dimensions are given by the certain angular values and the vertical dimension extends from −90° to +90° for each sector. Naturally, other sectoring techniques are available as well, for example, having in the FIG. 6 example, 24 sectors where sectors S1 to S12 cover, for each sector, the whole elevation or vertical range between −90° and 0° or between 0% and 50%, where the other sectors S13 to S24 cover the upper hemisphere between elevation angles from 0° to 90° or cover the upper half of the "horizon" extending between 50% and 100%.

Figure 7:
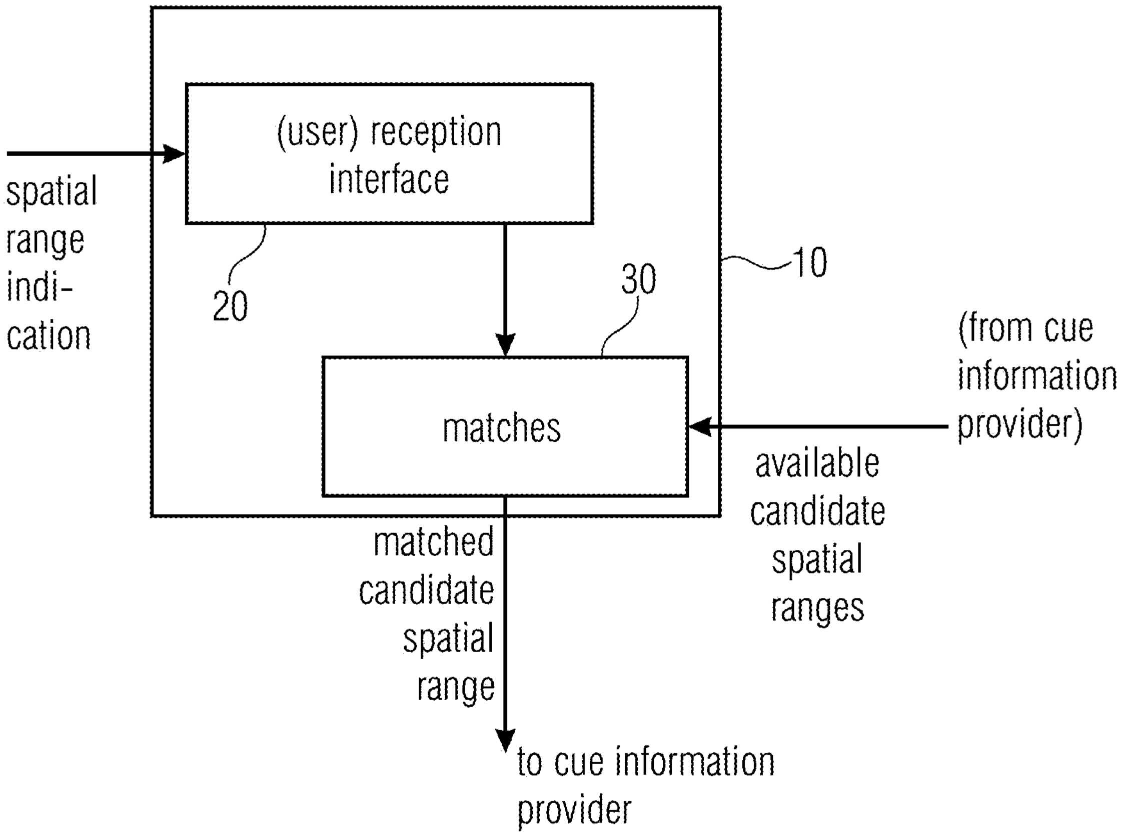
FIG. 7 illustrates an implementation of the spatial information interface.

FIG. 7 illustrates an implementation of a spatial information interface 10 of FIG. 1*a*. Particularly, the spatial information interface comprises an actual (user) reception interface for receiving the spatial range indication. The spatial range indication can be input by the user herself or himself or can be derived from head tracker information in case of a virtual reality or augmented matcher 30 matches actually received limited spatial range with the available candidate spatial ranges that are known from the cue information provider 200 in order to find a matched candidate spatial range that is closest to the actually input limited spatial range. Based on this matched candidate spatial range, the cue information provider 200 from FIG. 1*a* delivers the one or more cue information items such as inter-channel data or filter functions. The matched candidate spatial range or the limited spatial range may comprise a pair of azimuth angles or a pair of elevation angles or both as illustrated, for example, in FIG. 1*b*, showing an azimuth range and an elevation range for a sector.

Alternatively, as illustrated in FIG. 6, the limited spatial range may be limited by an information on a horizontal distance, an information on a vertical distance or an information on a vertical distance and an information on the horizontal distance. When the maximum spatial range is rastered in two-dimensions, not only a single vertical or horizontal distance is sufficient but a pair of a vertical distance and a horizontal distance as illustrated with respect to sector S5 is necessary. Again alternatively, the limited spatial range information may comprise a code identifying the limited spatial range as a specific sector of the maximum spatial range where the maximum spatial range comprises a plurality of different sectors. Such a code is, for example, given by the indications S1 to S24, since each code is uniquely associated with a certain geometrical two-dimensional or three-dimensional sector at the schematic sector map 600.

Figure 8:
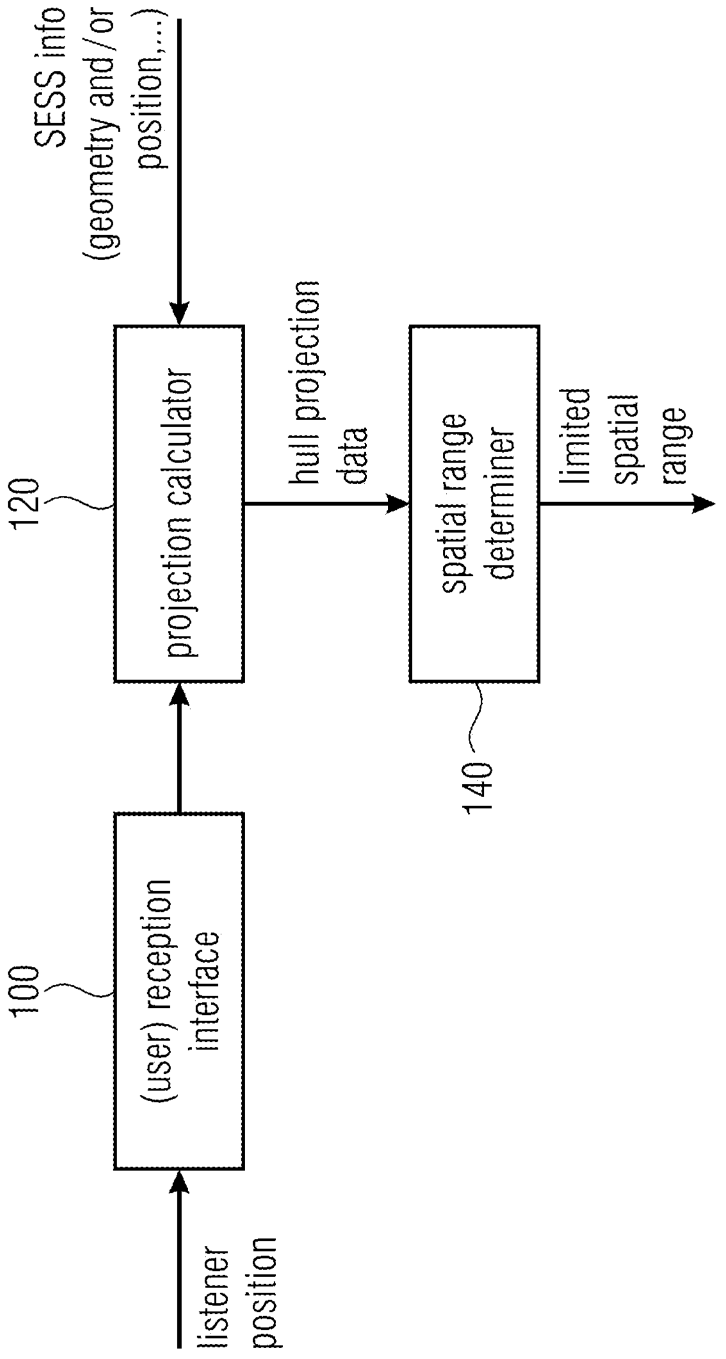
FIG. 8 illustrates another implementation of the spatial information interface relying on projection calculation procedures.

FIG. 8 illustrates a further implementation of a spatial information interface consisting of, again, the user reception interface 100 but now consisting, additionally, of a projection calculator 120 and a subsequently connected spatial range determiner 140. The user reception interface 100 exemplarily receives the listener position where the listener position comprises the actual location of the user in a certain environment and/or the orientation of the user at the certain location. Thus, a listener position may relate to either the actual location or the actual orientation or both, the actual listener's location and the actual listener's orientation. Based on this data, a projection calculator 120 calculates, using information on the spatially extended sound source, so-called hull projection data. SESS information may comprise the geometry of the spatially extended sound source and/or the position of the spatially extended sound source and/or the orientation of the spatially extended sound source, etc. Based on the hull projection data, the spatial range determiner 140 determines the limited spatial range in one of the alternatives illustrated in FIG. 6, or as discussed with respect to FIGS. 10, 11 or FIG. 12 to FIG. 18, where the limited spatial range is given by two or more characteristic points illustrated in the examples between FIG. 12 and FIG. 18, where the set of characteristic points defines a certain limited spatial range from a full spatial range.

Figure 9A:
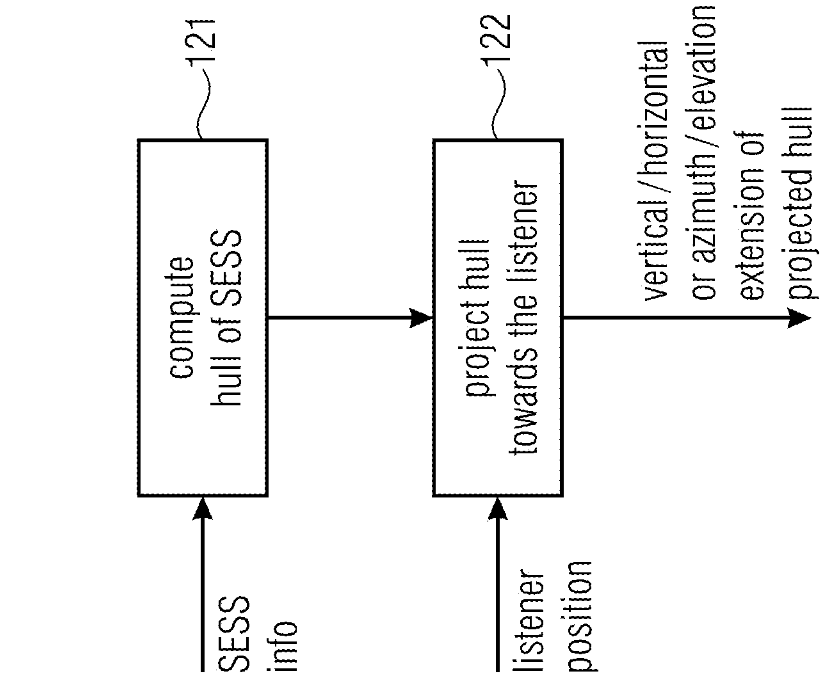
FIGS. 9*a* and 9*b* illustrate embodiments for performing the projection calculation and spatial range determination.
Figure 9B:
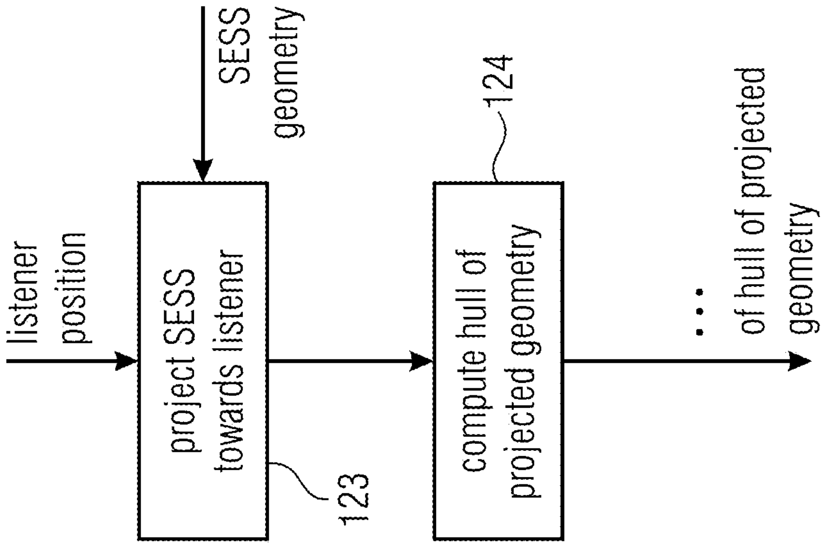

FIG. 9*a* and FIG. 9*b* illustrate different ways of computing the hull projection data output by block 120 of FIG. 8. In the embodiment of FIG. 9*a*, the spatial information interface is configured to compute the hull of the spatially extended sound source using, as the information on the spatially extended sound source, the geometry of the spatially extended sound source as indicated by block 121. The hull of the spatially extended sound source is projected 122 towards the listener using the listener position to obtain the projection of the two-dimensional or three-dimensional hull onto a projection plane. Alternatively, as illustrated in FIG. 9*b*, the spatially extended sound source and, particularly, the geometry of the spatially extended sound source as defined by the information on the geometry of the spatially extended sound source is projected in a direction towards the listener position illustrated at block 123, and the hull of a projected geometry is computed as indicated in block 124 to obtain the projection of the two-dimensional or three-dimensional hull onto the projection plane. The limited spatial range represents the vertical/horizontal or azimuth/elevation extension of the projected hull in the FIG. 9*a* embodiment or of the hull of the projected geometry as obtained by the FIG. 9*b* implementation.

Figure 10:
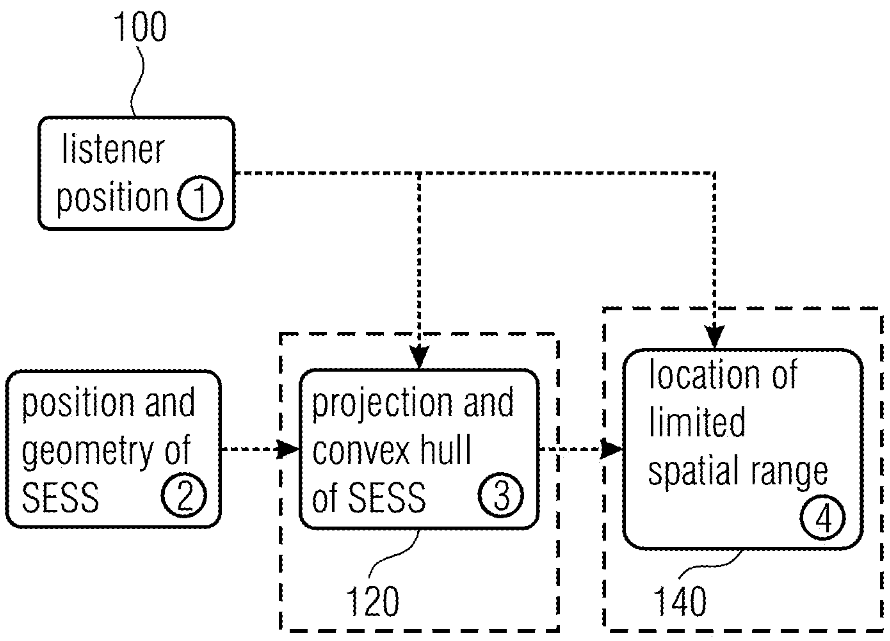
FIG. 10 illustrates another implementation of the spatial information interface.

FIG. 10 illustrates an implementation of the spatial information interface 10. It comprises a listener position interface 100 that is also illustrated in FIG. 8 as the user reception interface. Additionally, the position and geometry of the spatially extended sound source are input as illustrated, also, in FIG. 8. A projector 120 is provided and the calculator 140 for calculating the limited spatial range.

Figure 11:
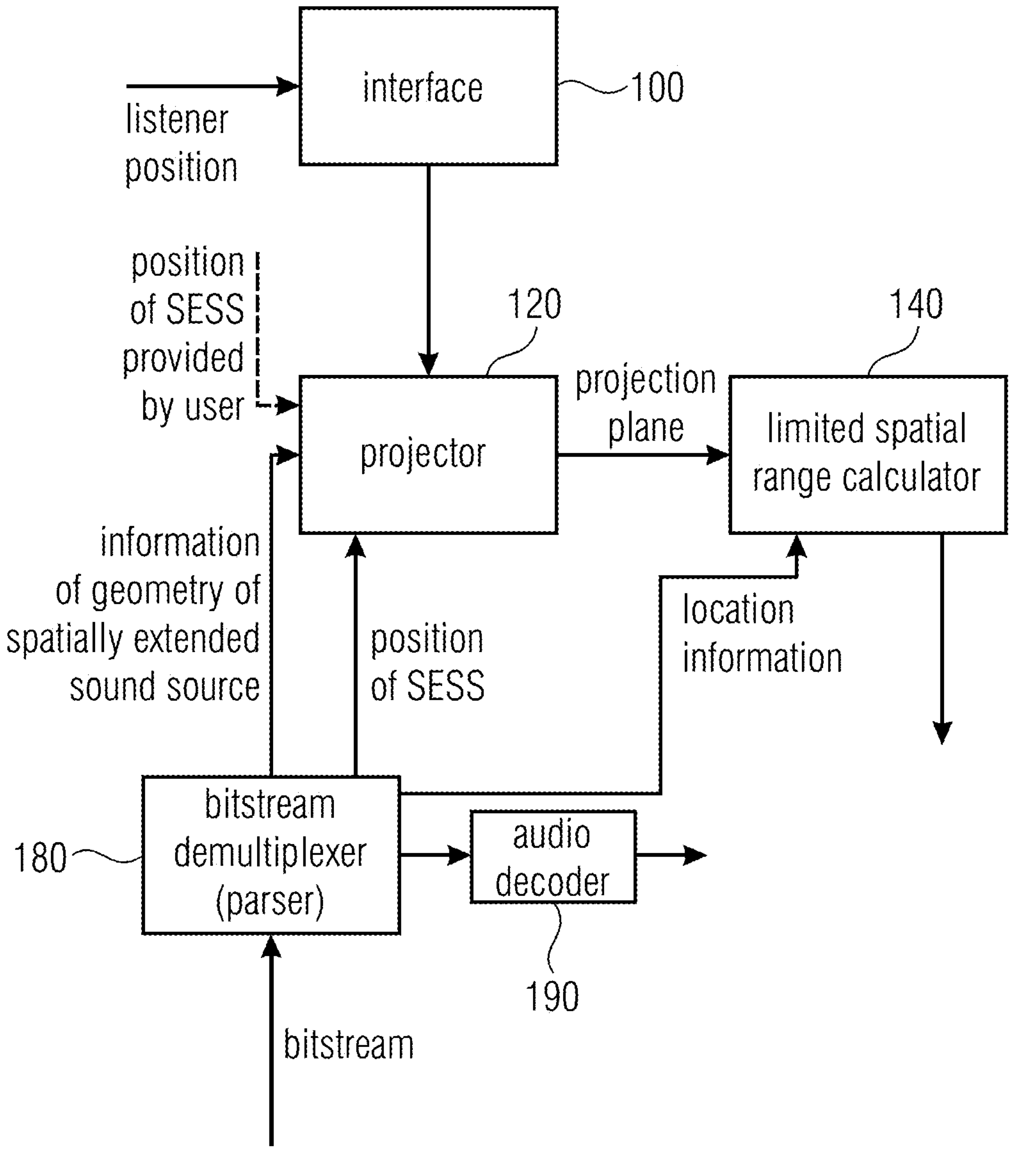
FIG. 11 illustrates an even further implementation of the spatial information interface related to a decoder implementation.

FIG. 11 illustrates an implementation of a spatial information interface comprising an interface 100, a projector 120, and a limited spatial range location calculator 140. The interface 100 is configured for receiving a listener position. The projector 120 is configured for calculating a projection of a two-dimensional or three-dimensional hull associated with the spatially extended sound source onto a projection plane using the listener position as received by the interface 100 and using, additionally, information on the geometry of the spatially extended sound source and, additionally, using an information on the position of the spatially extended sound source in the space. Advantageously, the defined position of the spatially extended sound source in the space and, additionally, the geometry of the spatially extended sound source in the space is received for reproducing a spatially extended sound source via a bitstream arriving at a bitstream demultiplexer or scene parser 180. The bitstream demultiplexer 180 extracts, from the bitstream, the information of the geometry of the spatially extended sound source and provides this information to the projector. The bitstream demultiplexer also extracts the position of the spatially extended sound source from the bitstream and forwards this information to the projector.

Advantageously, the bitstream also comprises the audio signal for the SESS having one or two different audio signals and, advantageously, the bitstream demultiplexer also extracts, from the bitstream, a compressed representation of the one or more audio signals, and the signal(s) is (are) decompressed/decoded by a decoder as an audio decoder 190. The decoded one or more signals are finally forwarded to the audio processor 300 of FIG. 1*a* for example, and the processor renders the at least two sound sources in line with the cue items provided by the cue information provider 200 of FIG. 1*a*.

Although FIG. 11 illustrates a bitstream-related reproduction apparatus having a bitstream demultiplexer 180 and an audio decoder 190, the reproduction can also take place in a situation different from an encoder/decoder scenario. For example, the defined position and geometry in space can already exist at the reproduction apparatus such as in a virtual reality or augmented reality scene, where the data is generated on site and is consumed on the same site. The bitstream demultiplexer 180 and the audio decoder 190 are not actually necessary, and the information of the geometry of the spatially extended sound source and the position of the spatially extended sound source are available without any extraction from a bitstream.

Subsequently embodiments of the present invention are discussed. Embodiments relate to rendering of Spatially Extended Sound Sources in 6DoF VR/AR (virtual reality/augmented reality).

Embodiments of the invention are directed to a method, apparatus or computer being designed to enhance the reproduction of Spatially Extended Sound Sources (SESS). In particular, the embodiments of the inventive method or apparatus consider the time-varying relative position between the spatially extended sound source and the virtual listener position. In other words, the embodiments of the inventive method or apparatus allow the auditory source width to match the spatial extent of the represented sound object at any relative position to the listener. As such, an embodiment of the inventive method or apparatus applies in particular to 6-degrees-of-freedom (6DoF) virtual, mixed and augmented reality applications where spatially extended sound source complements the traditionally employed point sources.

The embodiment of the inventive method or apparatus renders a spatially extended sound source by using a limited spatial range. The limited spatial range depends on the position of the listener relative to the spatially extended sound source.

FIG. 1*a* depicts the overview block diagram of a spatially extended sound source renderer according to the embodiment of the inventive method or apparatus. Key components of the block diagram are:

1. Listener position: This block provides the momentary position of the listener, as e.g. measured by a virtual reality tracking system. The block can be implemented as a detector 100 for detecting or an interface 100 for receiving the listener position.
2. Position and geometry of the spatially extended sound source: This block provides the position and geometry data of the spatially extended sound source to be rendered, e.g. as part of the virtual reality scene representation.
3. Projection and convex hull computation: This block 120 computes the convex hull of the spatially extended sound source geometry and then projects it in the direction towards the listener position (e.g. "image plane", see below). Alternatively, the same function can be achieved by first projecting the geometry towards the listener position and then computing its convex hull.
4. Location of limited spatial range determination: This block 140 computes the location of the limited spatial range from the convex hull projection data calculated by the previous block. In this computation, it may also consider the listener position and thus the proximity/distance of the listener (see below). The output are e.g. point locations collectively defining the limited spatial range.

FIG. 10 illustrates an overview of the block diagram of an embodiment of the inventive method or apparatus. Dashed lines indicate the transmission of metadata such as geometry and positions.

The locations of the points collectively defining the limited spatial range depend on the geometry, in particular spatial extent, of the spatially extended sound source and the relative position of the listener with respect to the spatially extended sound source. In particular, the points defining the limited spatial range may be located on the projection of the convex hull of the spatially extended sound source onto a projection plane. The projection plane may be either a picture plane, i.e., a plane perpendicular to the sightline from the listener to the spatially extended sound source or a spherical surface around the listener's head. The projection plane is located at an arbitrary small distance from the center of the listener's head. Alternatively, the projection convex hull of the spatially extended sound source may be computed from the azimuth and elevation angles which are a subset of the spherical coordinates relative from the listener head's perspective. In the illustrative examples below, the projection plane is advantageous due to its more intuitive character. In the implementation of the computation of the projected convex hull, the angular representation is advantageous due to simpler formalization and lower computational complexity. Both the projection of the spatially extended sound source's convex hull is identical to the convex hull of the projected spatially extended sound source geometry, i.e. the convex hull computation and the projection onto a picture plane can be used in either order.

When the listener position relative to the spatially extended sound source changes, then the projection of the spatially extended sound source onto the projection plane changes accordingly. In turn, the locations of the points defining the limited spatial range change accordingly. The points shall be advantageously chosen such that they change smoothly for continuous movement of the spatially extended sound source and the listener. The projected convex hull is changed when the geometry of the spatially extended sound source is changed. This includes rotation of the spatially extended sound source geometry in 3D space which alters the projected convex hull. Rotation of the geometry is equal to an angular displacement of the listener position relative to the spatially extended sound source and is such as referred to in an inclusive manner as the relative position of the listener and the spatially extended sound source. For instance, a circular motion of the listener around a spherical spatially extended sound source is represented by rotating the points defining the limited spatial range change around the center of gravity. Equally, rotation of the spatially extended sound source with a stationary listener results in the same change of the points defining the limited spatial range.

The spatial extent as it is generated by the embodiment of the inventive method or apparatus is inherently reproduced correctly for any distance between the spatially extended sound source and the listener. Naturally, when the user approaches the spatially extended sound source, the opening angle between the points defining the limited spatial range change increases as it is appropriate for modeling physical reality.

Hence, the angular placement of the points defining the limited spatial range is uniquely determined by the location on the projected convex hull on the projection plane.

To specify the geometric shape/convex hull of the spatially extended sound source, an approximation is used (and, possibly, transmitted to the renderer or renderer core) including a simplified 1D, e.g., line, curve; 2D, e.g., ellipse, rectangle, polygons; or 3D shape, e.g., ellipsoid, cuboid and polyhedra. The geometry of the spatially extended sound source or the corresponding approximate shape, respectively, may be described in various ways, including:

Parametric description, i.e., a formalization of the geometry via a mathematical expression which accepts additional parameters. For instance, an ellipsoid shape in 3D may be described by an implicit function on the Cartesian coordinate system and the additional parameters are the extend of the principal axes in all three directions. Further parameters may include 3D rotation, deformation functions of the ellipsoid surface.

Polygonal description, i.e., a collection of primitive geometric shapes such as lines, triangles, square, tetrahedron, and cuboids. The primate polygons and polyhedral may the concatenated to larger more complex geometries.

In certain application scenarios, the focus is on compact and interoperable storage/transmission of 6DoF VR/AR content. In this case, the entire chain consists of three steps:

1. Authoring/encoding of the desired spatially extended sound sources into a bitstream
2. Transmission/storage of the generated bitstream. In accordance with the presented invention, the bitstream contains, besides other elements, the description of the spatially extended sound source geometries (parametric or polygons) and the associated source basis signal(s), such like a monophonic or a stereophonic piano recording. The waveforms may be compressed using perceptual audio coding algorithms, such as mp3 or MPEG-2/4 Advanced Audio Coding (AAC).
3. Decoding/rendering of the spatially extended sound sources based on the transmitted bitstream as described previously.

Subsequently, various practical implementation examples are presented. These include a spherical spatially extended sound source, an ellipsoid spatially extended sound source, a line spatially extended sound source, a cuboid spatially extended sound source, distance-dependent limited spatial ranges, and/or a piano-shaped spatially extended sound source or a spatially extended sound source shape as any other musical instrument.

As described in embodiments of the inventive method or apparatus above various methods for determining the location of the points defining the limited spatial range may be applied. The following practical examples demonstrate some isolated methods in specific cases. In a complete implementation of the embodiment of the inventive method or apparatus, the various methods may be combined as appropriate considering computational complexity, application purpose, audio quality and ease of implementation.

The spatially extended sound source geometry is indicated as a surface mesh. Note that the mesh visualization does not imply that the spatially extended sound source geometry is described by a polygonal method as in fact the spatially extended sound source geometry might be generated from a parametric specification. The listener position is indicated by a blue triangle. In the following examples the picture plane is chosen as the projection plane and depicted as a transparent gray plane which indicates a finite subset of the projection plane. Projected geometry of the spatially extended sound source onto the projection plane is depicted with the same surface mesh. The points defining the limited spatial range on the projected convex hull are depicted as crosses on the projection plane. The back projected points defining the limited spatial range onto the spatially extended sound source geometry are depicted as dots. The corresponding points defining the limited spatial range on the projected convex hull and the back projected points defining the limited spatial range on the spatially extended sound source geometry are connected by lines to assist to identify the visual correspondence. The positions of all objects involved are depicted in a Cartesian coordinate system with units in meters. The choice of the depicted coordinate system does not imply that the computations involved are performed with Cartesian coordinates.

Figure 12:
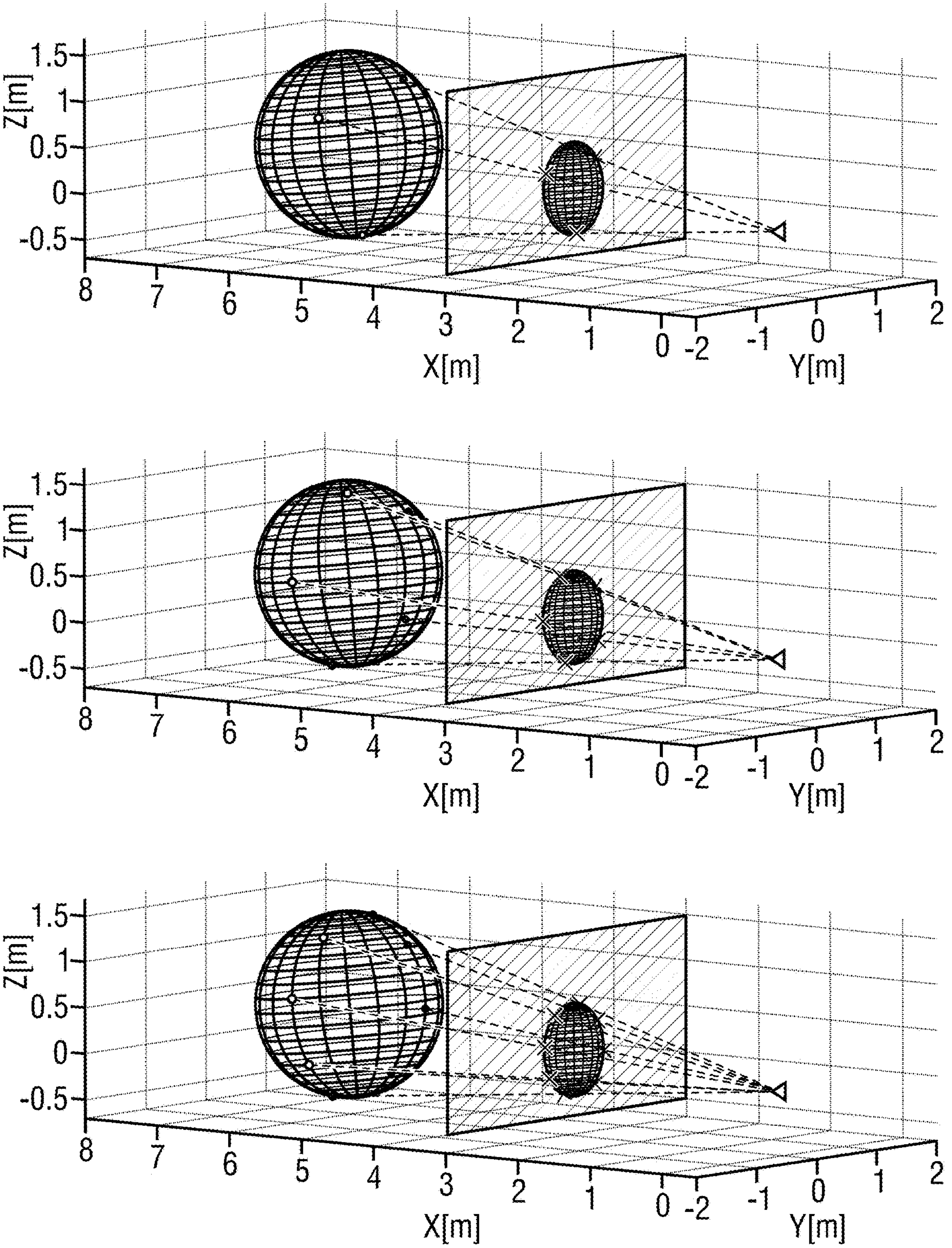
FIG. 12. illustrates the calculation of a limited spatial range for a spherical spatially extended sound source.

The first example in FIG. 12 considers a spherical spatially extended sound source. The spherical spatially extended sound source has a fixed size and fixed position relative to the listener. Three different set of three, five and eight points defining the limited spatial range are chosen on the projected convex hull. All three sets of points defining the limited spatial range are chosen with uniform distance on the convex hull curve. The offset positions of the points defining the limited spatial range on the convex hull curve are deliberately chosen such that the horizontal extent of the spatially extended sound source geometry is well represented. FIG. 12 illustrates spherical spatially extended sound source with different numbers (i.e., 3 (top), 5 (middle), and 8 (bottom)) of points defining the limited spatial range uniformly distributed on the convex hull.

Figure 13:
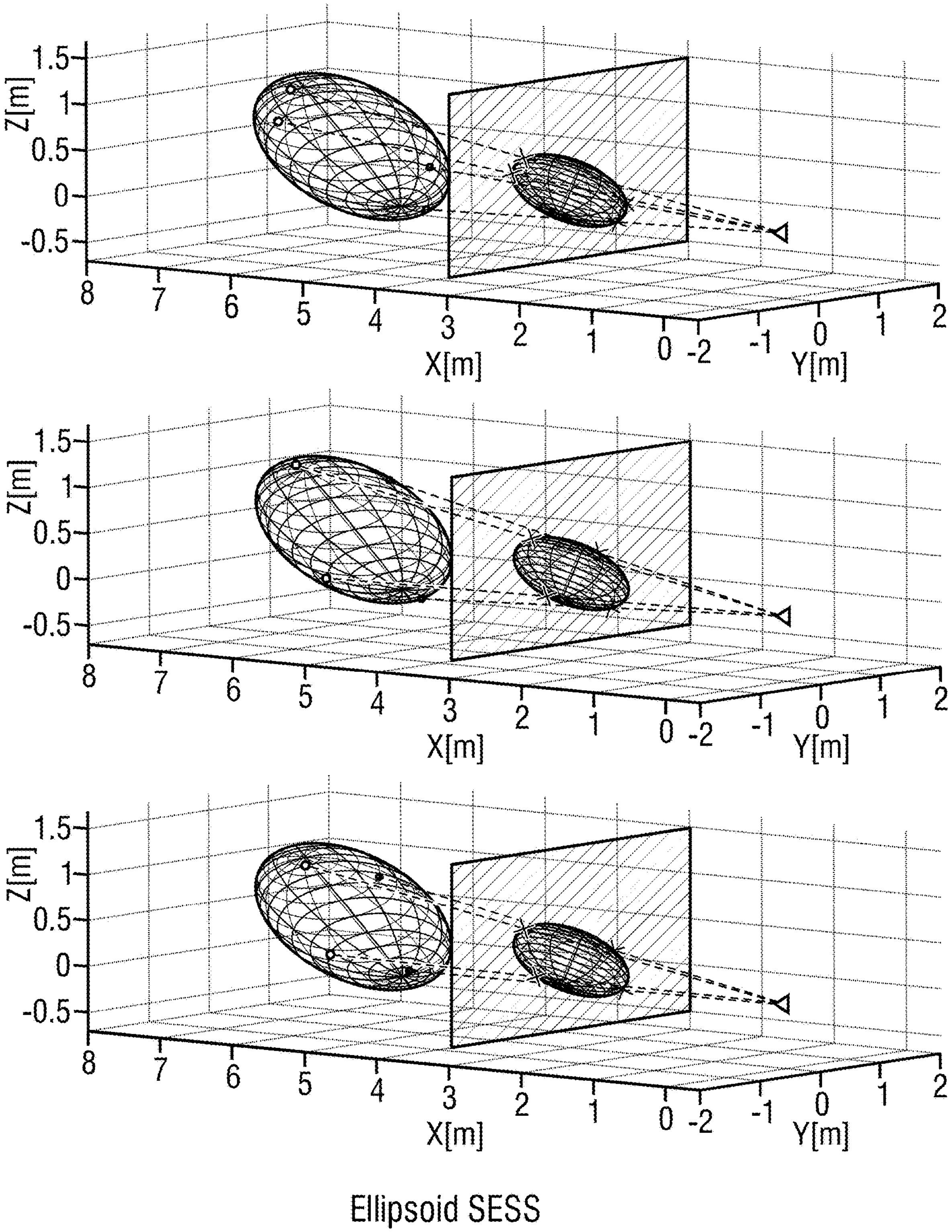
FIG. 13 illustrates further calculations of limited spatial ranges for an ellipsoid spatially extended sound source.

The next example in FIG. 13 considers an ellipsoid spatially extended sound source. The ellipsoid spatially extended sound source has a fixed shape, position and rotation in 3D space. Four points defining the limited spatial range are chosen in this example. Three different methods of determining the location of the points defining the limited spatial range are exemplified:

a) two points defining the limited spatial range are placed at the two horizontal extremal points and two points defining the limited spatial range are placed at the two vertical extremal points. Whereas, the extremal point positioning is simple and often appropriate. This example shows that this method might yield point locations which are relatively close to each other.

b) All four points defining the limited spatial range are distributed uniformly on the projected convex hull. The offset of the points defining the limited spatial range location is chosen such that topmost point location coincides with the topmost point location in a).

c) All four points defining the limited spatial range are distributed uniformly on a shrunk projected convex hull. The offset location of the point locations is equal to the offset location chosen in b). The shrink operation of the projected convex hull is performed towards the center of gravity of the projected convex hull with a direction independent stretch factor.

Thus, FIG. 13 illustrates an ellipsoid spatially extended sound source with four points defining the limited spatial range under three different methods of determining the location of the points defining the limited spatial range: a/top) horizontal and vertical extremal points, b/middle) uniformly distributed points on the convex hull, c/bottom) uniformly distributed points on a shrunk convex hull.

Figure 14:
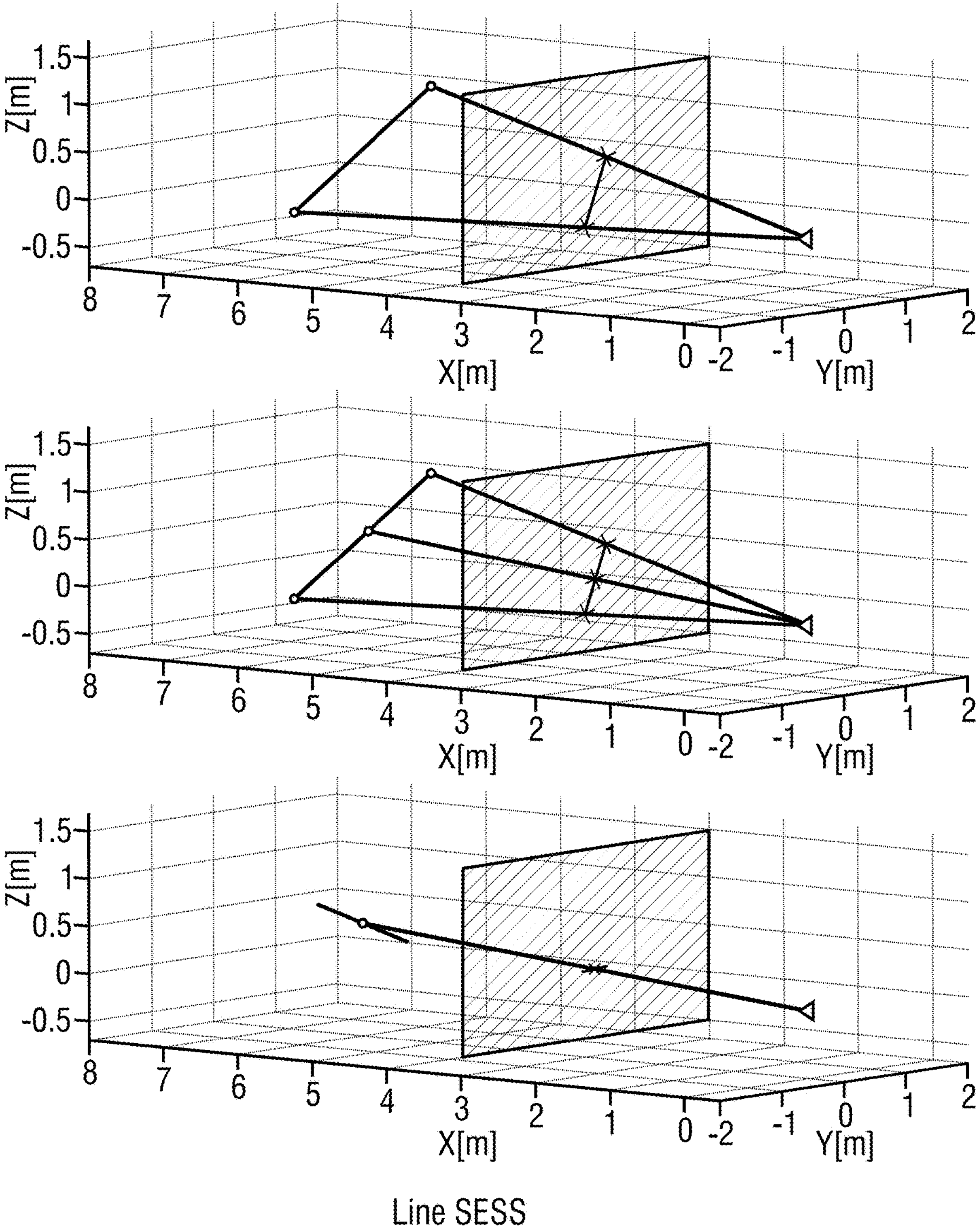
FIG. 14 illustrates a further calculation of a limited spatial range for a line spatially extended sound source.

The next example in FIG. 14 considers a line spatially extended sound source. Whereas the previous examples considered volumetric spatially extended sound source geometry, this example demonstrates that the spatially extended sound source geometry may well be chosen as a single dimensional object within 3D space. Subfigure a) depicts two points defining the limited spatial range placed on the extremal points of the finite line spatially extended sound source geometry. b) Two points defining the limited spatial range are placed at the extremal points of the finite line spatially extended sound source geometry and one additional point is placed in the middle of the line. As described in embodiments of the inventive method or apparatus, placing additional points within the spatially extended sound source geometry may help to fill large gaps in large spatially extended sound source geometries. c) The same line spatially extended sound source geometry as in a) and b) is considered, however the relative angle towards the listener altered such that projected length of the line geometry is considerably smaller. As described in embodiments of the inventive method or apparatus above, the reduced size of the projected convex hull may be represented by a reduced number of points defining the limited spatial range, in this particular example, by a single point located in the center of the line geometry.

Thus, FIG. 14 illustrates a line spatially extended sound source with three different methods to distribute the location of the points defining the limited spatial range: a/top) two extremal points on the projected convex hull; b/middle) two extremal points on the projected convex hull with an additional point in the center of the line; c/bottom) one or two points defining the limited spatial range in the center of the convex hull as the projected convex hull of the rotated line is too small to allow more than one or two points.

Figure 15:
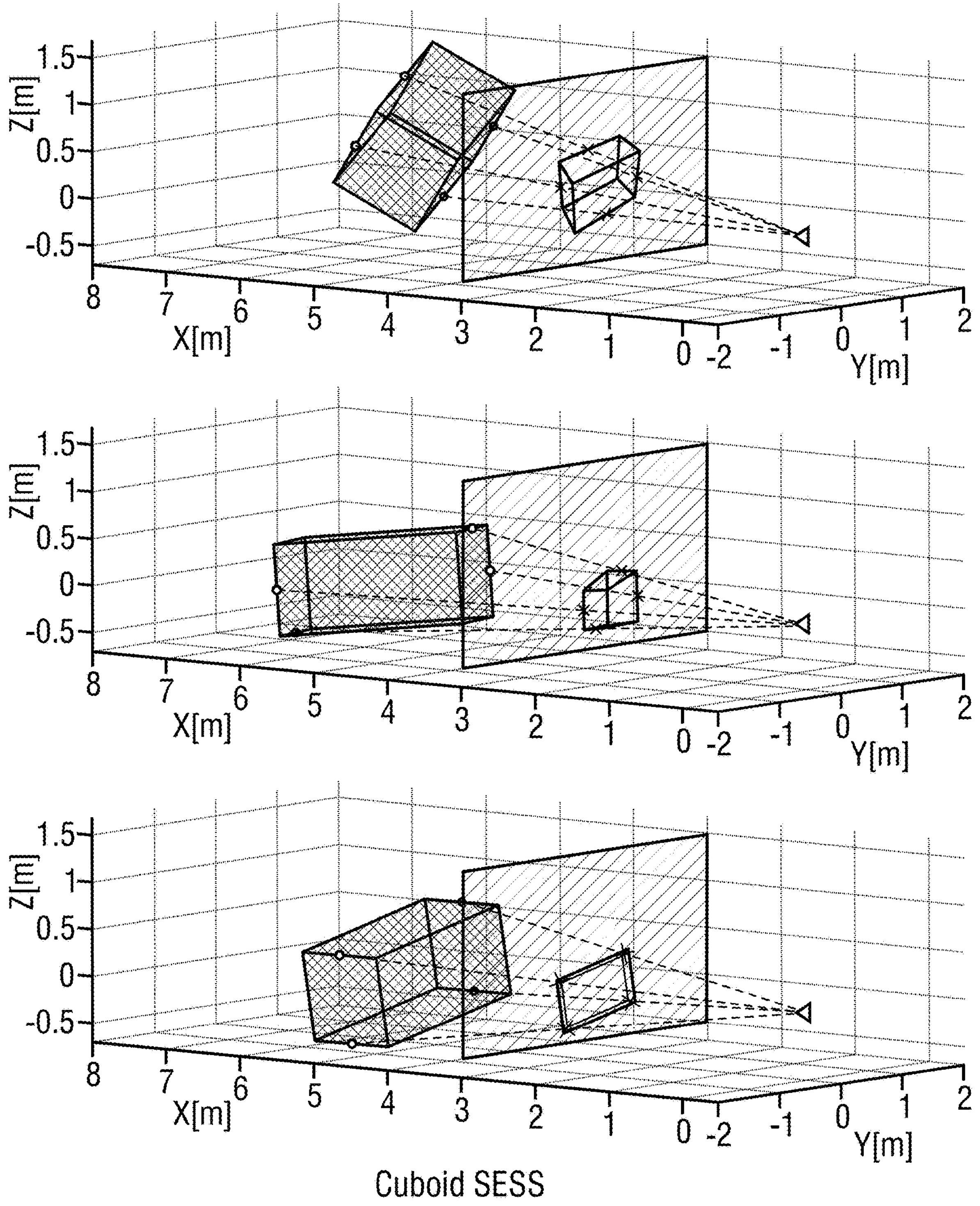
FIG. 15 illustrates a further illustration for the calculation of a limited spatial range for a cuboid spatially extended sound source.

The next example in FIG. 15 considers a cuboid spatially extended sound source. The cuboid spatially extended sound source has fixed size and fixed location, however the relative position of the listener changes. Subfigures a) and b) depicts differing methods of placing four points defining the limited spatial range on the projected convex hull. The back projected point locations are uniquely determined by the choice on the projected convex hull. c) depicts four points defining the limited spatial range which do not have well-separated back projection locations. Instead, the distances of the point locations are chosen equal to the distance of the center of gravity of the spatially extended sound source geometry.

Thus, FIG. 15 illustrates a cuboid spatially extended sound source with three different methods to distribute the points defining the limited spatial range: a/top) two points defining the limited spatial range on the horizontal axis and two points defining the limited spatial range on the vertical axis; b/middle) two points defining the limited spatial range on the horizontal extremal points of the projected convex hull and two points defining the limited spatial range on the vertical extremal points of the projected convex hull; c/bottom) back projected point distances are chosen to be equal to the distance of the center of gravity of the spatially extended sound source geometry.

Figure 16:
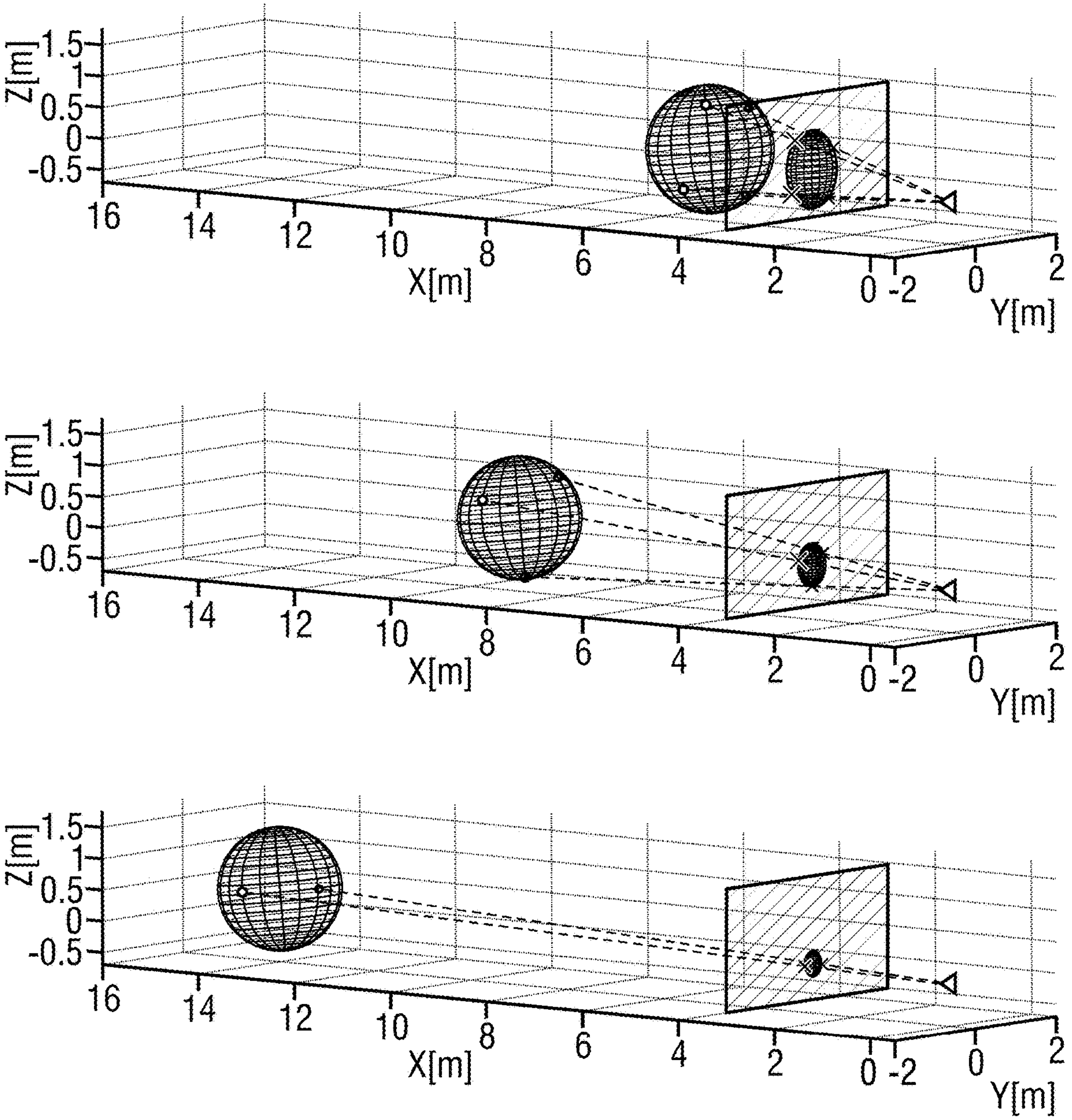
FIG. 16 illustrates a further example for calculating the limited spatial range for a spherical spatially extended sound source.

The next example in FIG. 16 considers a spherical spatially extended sound source of fixed size and shape, but at three different distances relative to the listener position. The points defining the limited spatial range are distributed uniformly on the convex hull curve. The number of points defining the limited spatial range is dynamically determined from the length of the convex hull curve and the minimum distance between the possible point locations. a) The spherical spatially extended sound source is at close distance such that four points defining the limited spatial range are chosen on the projected convex hull. b) The spherical spatially extended sound source is at medium distance such that three points defining the limited spatial range are chosen on the projected convex hull. a) The spherical spatially extended sound source is at far distance such that only two points defining the limited spatial range are chosen on the projected convex hull. As described in embodiments of the inventive method or apparatus above, the number of points defining the limited spatial range may also be determined from the extent represented in spherical angular coordinates.

Thus, FIG. 16 illustrates a spherical spatially extended sound source of equal size but at different distances: a/top) close distance with four points defining the limited spatial range distributed uniformly on the projected convex hull; b/middle) middle distance with three points defining the limited spatial range distributed uniformly on the projected convex hull; c/bottom) far distance with two points defining the limited spatial range distributed uniformly on the projected convex hull.

Figure 17:
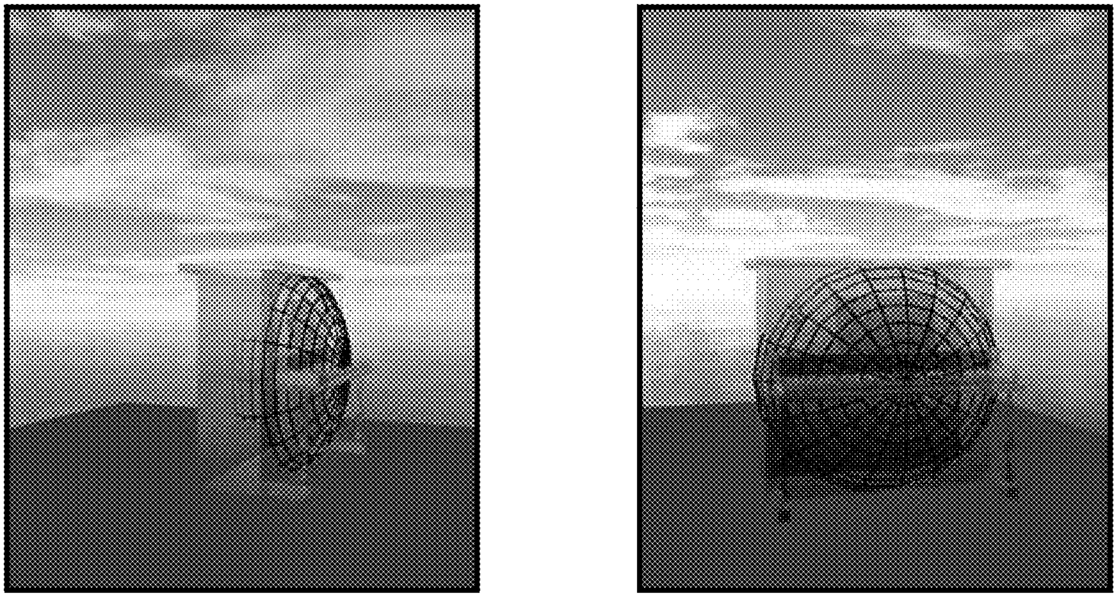
FIG. 17 illustrates a piano-shaped spatially extended sound source with an approximate parametric ellipsoid shape.
Figure 18:
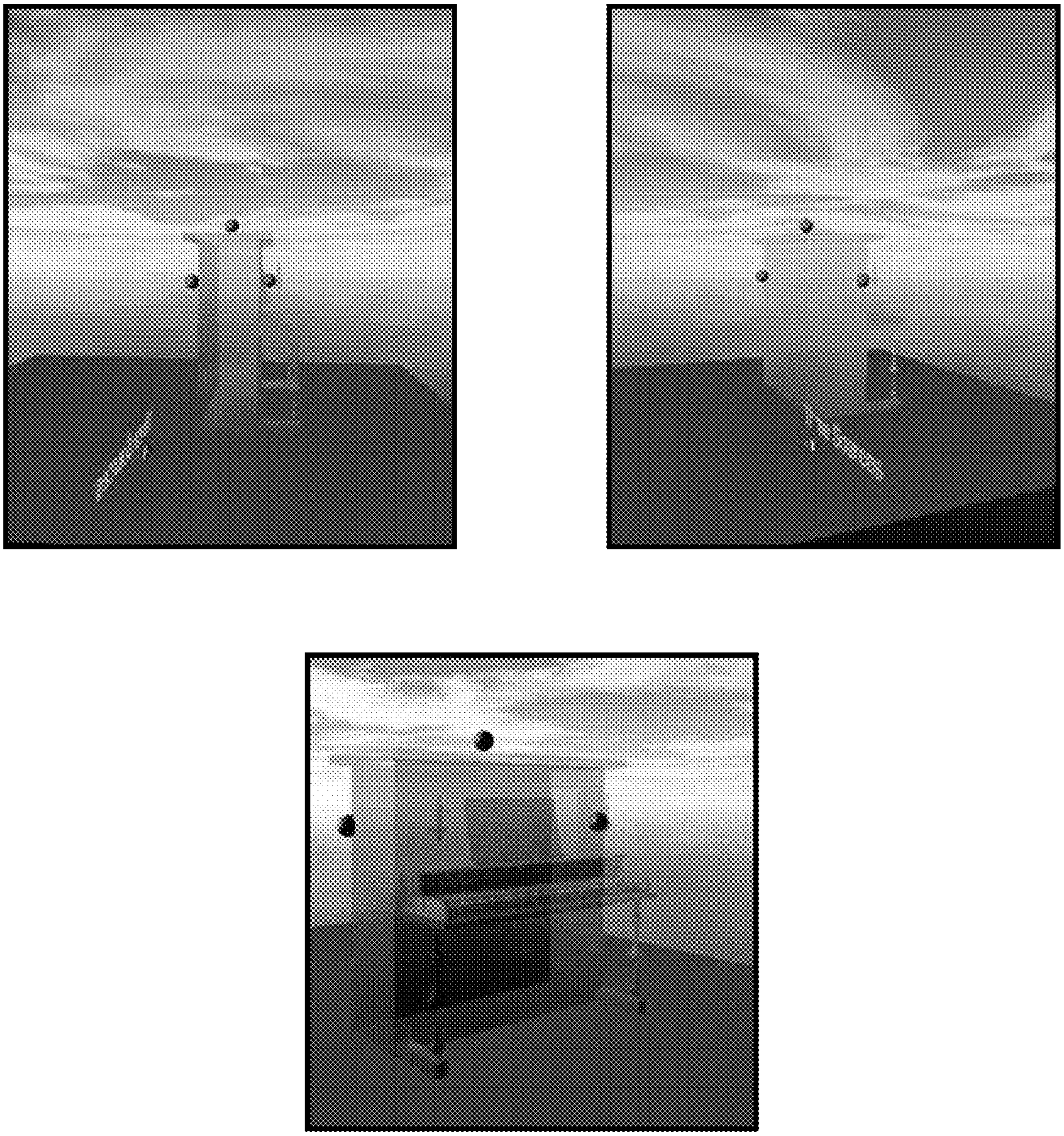
FIG. 18 illustrates points for defining the limited spatial range for the rendering of the piano-shaped spatially extended sound source.

The last example in FIGS. 17 and 18 considers a piano-shaped spatially extended sound source placed within a virtual world. The user wears a head-mounted display (HMD) and headphones. A virtual reality scene is presented to the user consisting of an open word canvas and a 3D upright piano model standing on the floor within the free movement area (see FIG. 17). The open world canvas is a spherical static image projected onto a sphere surrounding the user. In this particular case, the open world canvas depicts a blue sky with white clouds. The user is able to walk around and watch and listen to the piano from various angles. In this scene the piano is rendered using cues representing a single point source placed in the center of gravity or representing a spatially extended sound source with three points defining the limited spatial range on the projected convex hull (see FIG. 18).

To simplify the computation of the point, the piano geometry is abstracted to an ellipsoid shape with similar dimensions, see FIG. 17. Two substitute points are placed on left and right extremal points on the equatorial line, whereas the third substitute point remains at the north pole, see FIG. 18. This arrangement guarantees the appropriate horizontal source width from all angles at a highly reduced computational cost.

Thus, FIG. 17 illustrates a piano-shaped spatially extended sound source with an approximate parametric ellipsoid shape, and FIG. 18 illustrates a piano-shaped spatially extended sound source with three points defining the limited spatial range distributed on the vertical extremal points of the projected convex hull and the vertical top position of the projected convex hull. Note that for better visualization, the points defining the limited spatial range are placed on a stretched projected convex hull.

The application of the described technology may be as a part of an Audio 6DoF VR/AR standard. In this context, one has the classic encoding/bitstream/decoder(+renderer) scenario:

- In the encoder, the shape of the spatially extended sound source would be encoded as side information together with the 'basis' waveforms of the spatially extended sound source which may be either
  - a mono signal, or
  - a stereo signal (advantageously sufficiently decorrelated), or
  - even more recorded signals (also advantageously sufficiently decorrelated)
- characterizing the spatially extended sound source. These waveforms could be low bitrate coded.
- In the decoder/renderer, the spatially extended sound source shape and the corresponding waveforms are retrieved from the bitstream and used for rendering the spatially extended sound source as described previously.

Depending on the used embodiments and as alternatives to the described embodiments, it is to be noted that the interface can be implemented as an actual tracker or detector for detecting a listener position. However, the listening position will typically be received from an external tracker device and fed into the reproduction apparatus via the interface. However, the interface can represent just a data input for output data from an external tracker or can also represent the tracker itself.

As outlined, the bitstream generator can be implemented to generate a bitstream with only one sound signal for the spatially extended sound source, and, the remaining sound signals are generated on the decoder-side or reproduction side by means of decorrelation. When only a single signal exists, and when the whole space is to be filled up equally with this single signal, any location information is not necessary. However, it can be useful to have, in such a situation, at least additional information on a geometry of the spatially extended sound source.

Depending on the implementation, it is advantageous to use, within the cue information provider 200 of FIG. 1*a*, 1*b*, 4, 5, some kind of pre-calculated data in order to have the correct cue information items for a certain environment. This pre-calculated data, i.e., the set of values for each sector such as from the sector map 600 of FIG. 6 can be measured and stored so that the data within the, for example, look-up table 210 and the select HRTF blocks 220 are empirically determined. In another embodiment, this data can be pre-calculated or the data can be derived in a mixed empirical and pre-calculation procedure. Subsequently, the embodiment for calculating this data is given.

During lookup table generation, IACC, IAPD and IALD values needed for the SESS synthesis, as described before, are pre-calculated for a number of source extent ranges.

As mentioned before, as an underlying model the SESS is described by an infinite number of decorrelated point sources distributed over the whole source extent range. This model is approximated here by placing one decor-related point source at each HRTF data set position within the desired source extent range. By convolving these signals with the corresponding HRTF, the resulting left and right ear signal, $Y_l(\omega)$ respectively $Y_r(\omega)$, can be deter-mined. From these, IACC, IAPD and IALD values can be derived. In the following, a derivation of the corresponding expressions is given.

Given are N decorrelated signals $S_n(\omega)$ with equal power spectral density:

$$S_n(\omega)=P(\omega)\cdot e^{j\phi_n(\omega)},n=1,\ldots,N, \tag{14}$$

with $$E\{S_n(\omega)\cdot S_m^*(\omega)\}=\begin{cases}0, & n\neq m\\ P(\omega)^2, & n=m\end{cases}, \tag{15}$$

where N equals the number of HRTF data set points within the desired source extent range. These N input signals are thus each placed at a different HRTF data set position, with $$\mathrm{HRTF}_l(\omega,n)=A_{l,n}\cdot e^{j\phi_{l,n}},n=1,\ldots,N, \tag{16}$$

$$\mathrm{HRTF}_r(\omega,n)=A_{r,n}\cdot e^{j\phi_{r,n}},n=1,\ldots,N, \tag{17}$$

Note: $A_{l,n}$, $A_{r,n}$, $\Phi_{l,n}$, and $A_{l,n}$, in general depend on ω. However, this dependency is omitted here for notational simplicity. Using Eq. (16), (17), the left and right ear signals, $Y_l(\omega)$ respectively $Y_r(\omega)$, can be expressed as follows:

$$Y_l(\omega)=\sum_{n=1}^{N}A_{l,n}\cdot e^{j\phi_{l,n}}\cdot S_n(\omega), \tag{18}$$

$$Y_r(\omega)=\sum_{n=1}^{N}A_{r,n}\cdot e^{j\phi_{r,n}}\cdot S_n(\omega). \tag{19}$$

In order to determine the IACC, IALD and IAPD, first expressions for $E\{Y_l(\omega)\cdot Y_r^*(\omega)\}$, $E\{|Y_l(\omega)|^2\}$ and $E\{|Y_r(\omega)|^2\}$ are derived:

$$\begin{aligned}E\{Y_l(\omega)\cdot Y_r^*(\omega)\}&=E\left\{\sum_{n=1}^{N}A_{l,n}\cdot e^{j\phi_{l,n}}\cdot S_n(\omega)\cdot\sum_{m=1}^{N}A_{r,m}\cdot e^{j\phi_{r,m}}\cdot S_m^x(\omega)\right\}\\&=E\left\{\sum_{n=1}^{N}\sum_{m=1}^{N}A_{l,n}\cdot A_{r,m}\cdot e^{j(\phi_{l,n}-\phi_{r,m})}\cdot S_n(\omega)\cdot S_m^*(\omega)\right\},\\&\stackrel{1}{=}\sum_{n=1}^{N}\sum_{m=1}^{N}A_{l,n}\cdot A_{r,m}\cdot e^{j(\phi_{l,n}-\phi_{r,m})}\cdot E\{S_n(\omega)\cdot S_m^*(\omega)\}\\&=P(\omega)^2\cdot\sum_{n=1}^{N}A_{l,n}\cdot A_{r,n}\cdot e^{j(\phi_{l,n}-\phi_{r,m})}\end{aligned} \tag{20}$$

$$\begin{aligned}E\{|Y_l(\omega)|^2\}&=E\left\{\sum_{n=1}^{N}A_{l,n}\cdot e^{j\phi_{l,n}}\cdot S_n(\omega)\cdot\sum_{m=1}^{N}A_{l,m}\cdot e^{j\phi_{l,m}}\cdot S_m^*(\omega)\right\}\\&=E\left\{\sum_{n=1}^{N}\sum_{m=1}^{N}A_{l,n}\cdot A_{l,m}\cdot e^{j(\phi_{l,n}-\phi_{l,m})}\cdot S_n(\omega)\cdot S_m^*(\omega)\right\},\\&\stackrel{1}{=}\sum_{n=1}^{N}\sum_{m=1}^{N}A_{l,n}\cdot A_{l,m}\cdot e^{j(\phi_{l,n}-\phi_{l,m})}\cdot E\{S_n(\omega)\cdot S_m^*(\omega)\}\\&=P(\omega)^2\cdot\sum_{n=1}^{N}A_{l,n}^2\end{aligned} \tag{21}$$

$$E\{|Y_r(\omega)|^2\}=P(\omega)^2\cdot\sum_{n=1}^{N}A_{r,n}^2. \tag{22}$$

Using Eq. (20) to (22), the following expressions for IACC(ω), IALD(ω) and IAPD(ω) can be determined:

$$\begin{aligned}IACC(\omega)&=\frac{E\{Y_l(\omega)\cdot Y_r^*(\omega)\}}{\sqrt{E\{|Y_l(\omega)|^2\}\cdot E\{|Y_r(\omega)|^2\}}}\\&=\frac{\sum_{n=1}^{N}A_{l,n}\cdot A_{r,n}\cdot e^{j(\phi_{l,n}-\phi_{r,n})}}{\sqrt{\sum_{n=1}^{N}A_{l,n}^2\cdot\sum_{m=1}^{N}A_{r,m}^2}},\end{aligned} \tag{23}$$

$$\begin{aligned}IALD(\omega)&=10\log_{10}\frac{E\{|Y_l(\omega)|^2\}}{E\{|Y_r(\omega)|^2\}}\\&=10\log_{10}\frac{\sum_{n=1}^{N}A_{l,n}^2}{\sum_{n=1}^{N}A_{r,n}^2},\end{aligned} \tag{24}$$

$$\begin{aligned}IAPD(\omega)&=\angle(E\{Y_l(\omega)\cdot Y_r^*(\omega)\})\\&=\angle(IACC(\omega))\\&=\angle\left(\sum_{n=1}^{N}A_{l,n}\cdot A_{r,n}\cdot e^{j(\phi_{l,n}-\phi_{r,n})}\right).\end{aligned} \tag{25}$$

The left and right ear gain, $G_l(\omega)$ respectively $G_r(\omega)$, are determined by normalizing $E\{|Y_l(\omega)|^2$ respectively $E\{|Y_r(\omega)|^2$ by the number of sources as well as the source power:

$$G_l(\omega)=\sqrt{\frac{E\{|Y_l(\omega)|^2\}}{N\cdot P(\omega)^2}}=\sqrt{\frac{\sum_{n=1}^{N}A_{l,n}^2}{N}} \tag{26}$$

$$G_r(\omega)=\sqrt{\frac{E\{|Y_r(\omega)|^2\}}{N\cdot P(\omega)^2}}=\sqrt{\frac{\sum_{n=1}^{N}A_{r,n}^2}{N}} \tag{27}$$

As can be seen, all resulting expressions depend on the chosen HRTF data set only and do not depend on the input signals anymore.

In order to reduce the computational complexity during lookup table generation, one possibility is to not consider every available HRTF data set position. In this case, a desired spacing is defined. While this procedure reduces the computational complexity during pre-calculation, to some extent this will also lead to a degradation of the solution.

Embodiments of the present invention provide significant advantages compared to the state of the art.

From the fact that the proposed method requires two decorrelated input signals only, a number of advantages arise compared to current state of the art techniques that require a larger number of decorrelated input signals:

- The proposed method exhibits a lower computational complexity, as only one decorrelator has to be applied. Additionally, only two input signals have to be filtered.
- As pairwise decorrelation is usually higher when generating fewer decorrelated signals (and at the same time allowing the same amount of signal degradation), a more precise reproduction of the auditory cues is expected.
- Similarly, more signal degradations are expected in order to reach the same amount of pairwise decorrelation and thus the same precision of the reproduced auditory cues.

Subsequently, several interesting characteristics of embodiments of the present invention are summarized.

1. Only two decorrelated input signals (or one input signal plus a decorrelator) are needed.
2. [Frequency selective] adjustment of binaural cues of these input signals to efficiently achieve binaural output signals for the spatially extended sound source (instead of modeling of many single point sources that cover the area/volume of the SESS)

(a) Input ICCs are adjusted.
(b) ICPDs/ICTDs and ICLDs can be either adjusted in a dedicated processing step or can be introduced into the signals by using HRIR/HRTF processing with these characteristics.

3. The [frequency selective] target binaural cues are determined from a pre-computed storage (look-up table or another means of storing multi-dimensional data like a vector codebook or a multi-dimensional function fit, GMM, SVM) as a function of the spatial range to be filled (specific example: azimuth range, elevation range)
(a) Target IACCs are stored and recalled/used for synthesis.
(b) Target IAPDs/IATDs and IALDs can be either stored and recalled/used for synthesis or replaced by using HRIR/HRTF processing.

An implementation of the present invention may be as a part of a MPEG-I Audio 6 DoF VR/AR (virtual reality/augmented reality standard). In this context, one has an encoding/bitstream/decoder (plus renderer) application scenario. In the encoder, the shape of the spatially extended sound source or of the several spatially extended sound sources would be encoded as side information together with the (one or more) "spaces" waveforms of the spatially extended sound source. These waveforms that represent the signal input into block 300, i.e., the audio signal for the spatially extended sound source could be low bitrate coded by means of an AAC, EVS or any other encoder. In the decoder/renderer, where an application is, for example, illustrated in FIG. 11 as comprising a bitstream demultiplexor (parser 180 and an audio decoder 190), the SESS shape and the corresponding waveforms are retrieved from the bitstream and used for rendering the SESS. The procedures illustrated with respect to the present invention provide a high-quality, but low-complexity decoder/renderer.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] J. Blauert, *Spatial Hearing: Psychophysics of Human Sound Localization,* 3rd ed. Cambridge, Mass: MIT Press, 2001.
[2] H. Lauridsen, "Experiments Concerning Different Kinds of Room-Acoustics Recording," *Ingenioren,* 1954.
[3] G. Kendall, "The Decorrelation of Audio Signals and Its Impact on Spatial Imagery," *Computer Music Journal*, vol. 19, no. 4, pp. 71-87, 1995.
[4] C. Faller and F. Baumgarte, "Binaural cue coding-Part II: Schemes and applications," *IEEE Transactions on Speech and Audio Processing*, vol. 11, no. 6, pp. 520-531, November 2003.
[5] F. Baumgarte and C. Faller, "Binaural cue coding-Part I: Psychoacoustic fundamentals and design principles," *IEEE Transactions on Speech and Audio Processing*, vol. 11, no. 6, pp. 509-519, November 2003.
[6] F. Zotter and M. Frank, "Efficient Phantom Source Widening," *Archives of Acoustics*, vol. 38, pp. 27-37, March 2013.
[7] B. Alary, A. Politis, and V. Välimäki, "Velvet-noise decorrelator," *Proc. DAFx-*17*, Edinburgh, UK*, pp. 405-411, 2017.
[8] S. Schlecht, B. Alary, V. Välimäki, and E. Habets, "Optimized velvet-noise decorrelator," September 2018.

[9] V. Pulkki, "Uniform spreading of amplitude panned virtual sources," *Proceedings of the* 1999 *IEEE Workshop on Applications of Signal Processing to Audio and Acoustics. WASPAA'*99 (*Cat. No.* 99*TH*8452), pp. 187-190, 1999.

[10] ______, "Virtual Sound Source Positioning Using Vector Base Amplitude Panning," *Journal of the Audio Engineering Society*, vol. 45, no. 6, pp. 456-466, June 1997.

[11] V. Pulkki, M.-V. Laitinen, and C. Erkut, "Efficient Spatial Sound Synthesis for Virtual Worlds." Audio Engineering Society, February 2009.

[12] V. Pulkki, "Spatial Sound Reproduction with Directional Audio Coding," *Journal of the Audio Engineering Society*, vol. 55, no. 6, pp. 503-516, June 2007.

[13] T. Pihlajamäki, O. Santala, and V. Pulkki, "Synthesis of Spatially Extended Virtual Source with Time-Frequency Decomposition of Mono Signals," *Journal of the Audio Engineering Society*, vol. 62, no. 7/8, pp. 467-484, August 2014.

[14] C. Verron, M. Aramaki, R. Kronland-Martinet, and G. Pallone, "A 3-D Immersive Synthesizer for Environmental Sounds," *Audio, Speech, and Language Processing, IEEE Transactions on*, vol. 18, pp. 1550-1561, September 2010.

[15] G. Potard and I. Burnett, "A study on sound source apparent shape and wideness," pp. 6-9, August 2003.

[16] ______, "Decorrelation techniques for the rendering of apparent sound source width in 3D audio displays," January 2004, pp. 280-208.

[17] J. Schmidt and E. F. Schroeder, "New and Advanced Features for Audio Presentation in the MPEG-4 Standard." Audio Engineering Society, May 2004.

[18] S. Schlecht, A. Adami, E. Habets, and J. Herre, "Apparatus and Method for Reproducing a Spatially Extended Sound Source or Apparatus and Method for Generating a Bitstream from a Spatially Extended Sound Source," Patent Application PCT/EP2019/085 733.

[19] T. Schmele and U. Sayin, "Controlling the Apparent Source Size in Ambisonics Using Decorrelation Filters." Audio Engineering Society, July 2018.

[20] F. Zotter, M. Frank, M. Kronlachner, and J.-W. Choi, "Efficient Phantom Source Widening and Diffuseness in Ambisonics," January 2014.

[21] C. Borß, "An Improved Parametric Model for the Design of Virtual Acoustics and its Applications," Ph.D. dissertation, Ruhr-Universität Bochum, January 2011.

The invention claimed is:

1. An apparatus for synthesizing a spatially extended sound source, comprising:

a spatial information interface for receiving a spatial range indication indicating a limited spatial range for the spatially extended sound source within a maximum spatial range;

a cue information provider for providing one or more cue information items in response to the limited spatial range; and an audio processor for processing an audio signal representing the spatially extended sound source using the one or more cue information items, wherein the cue information provider is configured to store information on the one or more cue information items associated with a set of spaced candidate spatial ranges, the set of spaced limited spatial ranges covering the maximum spatial range, to match the limited spatial range to a candidate limited spatial range defining a candidate spatial range being closest to a specific limited spatial range defined by the limited spatial range, and to provide the one or more cue information items associated with the matched candidate limited spatial range, or wherein the limited spatial range comprises at least one of a pair of azimuth angles, a pair of elevation angles, an information on a horizontal distance, an information on a vertical distance, an information on an overall distance, and a pair of azimuth angles and a pair of elevation angles, or wherein the spatial range indication comprises a code identifying the limited spatial range as a specific sector of the maximum spatial range, wherein the maximum spatial range comprises a plurality of different sectors.

2. The apparatus of claim 1, wherein the cue information provider is configured to provide, as a cue information item, an inter-channel correlation value, wherein the audio signal comprises a first audio channel and a second audio channel for the spatially extended sound source, or wherein the audio signal comprises a first audio channel and a second audio channel is derived from the first audio channel by a second channel processor, and wherein the audio processor is configured to impose a correlation between the first audio channel and the second audio channel using the inter-channel correlation value.

3. The apparatus of claim 1, wherein the cue information provider is configured to provide, as a further cue information item, at least one of an inter-channel phase difference item, an inter-channel time difference item, an inter-channel level difference and a gain item, and a first gain and a second gain information item, wherein the audio signal comprises a first audio channel and a second audio channel for the spatially extended sound source, or wherein the audio signal comprises a first audio channel and a second audio channel is derived from the first audio channel by a second channel processor, and wherein the audio processor is configured to impose an inter-channel phase difference, an inter-channel time difference or an inter-channel level difference or absolute levels of the first audio channel and the second audio channel using the at least one of the inter-channel phase difference item, the inter-channel time difference item, the inter-channel level difference and a gain item, and the first and the second gain item.

4. The apparatus of claim 1, wherein the audio processor is configured to impose a correlation between the first channel and the second channel and, subsequent to the determination of the correlation, to impose the inter-channel phase difference, the inter-channel time difference or the inter-channel level difference or the absolute levels of the first channel and the second channel, or wherein the second channel processor comprises a decorrelation filter or a neural network processor for deriving, from the first audio channel, the second audio channel so that the second audio channel is decorrelated from the first audio channel.

5. The apparatus of claim 1, wherein the cue information provider comprises a filter function provider for providing audio filter functions as the one or more cue information item in response to the limited spatial range, and wherein the audio signal comprises a first audio channel and a second audio channel for the spatially extended sound source, or wherein the audio signal comprises a first audio channel and a second audio channel is derived from the first audio channel by a second channel processor, and wherein the audio processor comprises a filter applicator for applying the audio filter functions to the first audio channel and the second audio channel.

6. The apparatus of claim 5, wherein the audio filter functions comprise, for each of the first and the second audio channel, a head related transfer function, a head related impulse response, a binaural room impulse response or a room impulse response, or wherein the second channel processor comprises a decorrelation filter or a neural network processor for deriving, from the first audio channel, the second audio channel so that the second audio channel is decorrelated from the first audio channel.

7. The apparatus of claim 5, wherein the cue information provider is configured to provide, as a cue information item, an inter-channel correlation value, wherein the audio signal comprises a first audio channel and a second audio channel for the spatially extended sound source, or wherein the audio signal comprises a first audio channel and a second audio channel is derived from the first audio channel by a second channel processor, and wherein the audio processor is configured to impose a correlation between the first audio channel and the second audio channel using the inter-channel correlation value, and wherein the filter applicator is configured to apply the audio filter functions to a result of the correlation determination performed by the audio processor in response to the inter-channel correlation value.

8. An apparatus for synthesizing a spatially extended sound source, comprising:

a spatial information interface for receiving a spatial range indication indicating a limited spatial range for the spatially extended sound source within a maximum spatial range;

a cue information provider for providing one or more cue information items in response to the limited spatial range; and an audio processor for processing an audio signal representing the spatially extended sound source using the one or more cue information items, wherein the cue information provider comprises a memory for storing information on different cue information items in relation to different limited spatial ranges, wherein the memory comprises at least one of a look-up table, a vector codebook, a multi-dimensional function fit, a Gaussian Mixture Model (GMM), and a Support Vector Machine (SVM), and an output interface for retrieving, using the memory, the one or more cue information items associated with the limited spatial range, wherein the output interface is configured to retrieve the one or more cue information items by looking up the look-up table or by using the vector codebook, or by applying the multi-dimensional function fit, or by using the GMM or the SVM.

9. The apparatus of claim 1, wherein a sector of the plurality of different sectors comprises a first extension in an azimuth or horizontal direction and a second extension in an elevation or vertical direction, wherein the second extension in an elevation or vertical direction of a sector is greater than the first extension, or wherein the second extension covers a maximum elevation or vertical direction range.

10. The apparatus of claim 1, wherein the plurality of different sectors are defined in such a way that a distance between centers of adjacent sectors in the azimuth or horizontal direction is greater than 5 degrees or even greater than or equal to 10 degrees.

11. The apparatus of claim 1, wherein the audio processor is configured to generate, from the audio signal, a processed first channel and a processed second channel for a binaural rendering or a loudspeaker rendering or an active crosstalk-reduction loudspeaker rendering.

12. An apparatus for synthesizing a spatially extended sound source, comprising:

a spatial information interface for receiving a spatial range indication indicating a limited spatial range for the spatially extended sound source within a maximum spatial range;

a cue information provider for providing one or more cue information items in response to the limited spatial range, wherein the cue information provider is configured to provide one or more inter-channel correlation cue values as the one or more cue information items; and an audio processor for processing an audio signal representing the spatially extended sound source using the one or more cue information items, wherein the audio processor is configured to generate, from the audio signal, a processed first channel and a processed second channel in such a way that the processed first channel and the processed second channel comprise an inter-channel correlation value as controlled by the one or more inter-channel correlation cue values.

13. The apparatus of claim 1, wherein the cue information provider is configured for providing the one or more cue information items for a plurality of frequency bands in response to the limited spatial range being identical for the plurality of frequency bands, wherein the cue information items for different bands are different from each other.

14. An apparatus for synthesizing a spatially extended sound source, comprising:

a spatial information interface for receiving a spatial range indication indicating a limited spatial range for the spatially extended sound source within a maximum spatial range;

a cue information provider for providing one or more cue information items in response to the limited spatial range; and an audio processor for processing an audio signal representing the spatially extended sound source using the one or more cue information items, wherein the cue information provider is configured for providing one or more cue information items for a plurality of different frequency bands, and wherein the audio processor is configured to process the audio signal in a spectral domain, wherein a cue information item for a band is applied to a plurality of spectral values of the audio signal in the band, or wherein the audio processor is configured to either receive a first audio channel and a second audio channel as the audio signal representing the spatially extended sound source, or wherein the audio processor is configured to receive a first audio channel as the audio signal representing the spatially extending sound source and to derive the second audio channel by a second channel processor, wherein the first audio channel and the second audio channel are decorrelated with each other by a certain degree of decorrelation, wherein the cue information provider is configured for providing an inter-channel correlation value as the one or more cue information items, and wherein the audio processor is configured for decreasing a correlation degree between the first channel and the second channel to the value indicated by the one or more inter-channel correlation cues provided by the cue information provider.

15. The apparatus of claim 1, further comprising an audio signal interface for receiving the audio signal representing the spatially extended sound source, wherein the audio signal only comprises a first audio channel or only comprises a first audio channel and a second audio channel, or the audio signal does not comprise more than two audio channels.

16. An apparatus for synthesizing a spatially extended sound source, comprising:

a spatial information interface for receiving a spatial range indication indicating a limited spatial range for the spatially extended sound source within a maximum spatial range;

a cue information provider for providing one or more cue information items in response to the limited spatial range; and an audio processor for processing an audio signal representing the spatially extended sound source using the one or more cue information items, wherein the spatial information interface is configured for receiving a listener position as the spatial range indication, for calculating a projection of a two-dimensional or three-dimensional hull associated with the spatially extended sound source onto a projection plane using, as the spatial range indication, the listener position and information on the spatially extended sound source, or for calculating a two-dimensional or three-dimensional hull of a projection of a geometry of the spatially extended sound source onto a projection plane using, as the spatial range indication, the listener position and information on the spatially extended sound source, and for determining the limited spatial range from hull projection data.

17. The apparatus of claim 16, wherein the spatial information interface is configured to compute the hull of the spatially extended sound source using as the information on the spatially extended sound source, the geometry of the spatially extended sound source and to project the hull in a direction towards the listener using the listener position to acquire the projection of the two-dimensional or three-dimensional hull onto the projection plane, or to project the geometry of the spatially extended sound source as defined by the information on the geometry of the spatially extended sound source in a direction towards the listener position and to calculate the hull of a projected geometry to acquire the projection of the two-dimensional or three-dimensional hull onto the projection plane.

18. The apparatus of claim 16, wherein the spatial information interface is configured to determine the limited spatial range so that a border of a sector defined by the limited spatial range is located on the right of the projection plane with respect to the listener and/or on the left of the projection plane with respect to the listener and/or on top of the projection plane with respect to the listener and/or at the bottom of the projection plane with respect to the listener or coincides e.g. within a tolerance of +/−10% with one of a right border, a left border, an upper border and a lower border of the projection plane with respect to the listener.

19. A method of synthesizing a spatially extended sound source, the method comprising:

receiving a spatial range indication indicating a limited spatial range for the spatially extended sound source within a maximum spatial range;

providing one or more cue information items in response to the limited spatial range; and processing an audio signal representing the spatially extended sound source using the one or more cue information items, wherein the providing comprises storing information on the one or more cue information items associated with a set of spaced candidate spatial ranges, the set of spaced limited spatial ranges covering the maximum spatial range, matching the limited spatial range to a candidate limited spatial range defining a candidate spatial range being closest to a specific limited spatial range defined by the limited spatial range and providing the one or more cue information items associated with the matched candidate limited spatial range, or wherein the limited spatial range comprises at least one of a pair of azimuth angles, a pair of elevation angles, an information on a horizontal distance, an information on a vertical distance, an information on an overall distance, and a pair of azimuth angles and a pair of elevation angles, or wherein the spatial range indication comprises a code identifying the limited spatial range as a specific sector of the maximum spatial range, wherein the maximum spatial range comprises a plurality of different sectors, or wherein the providing comprises using a memory for storing information on different cue information items in relation to different limited spatial ranges, wherein the memory comprises at least one of a look-up table, a vector codebook, a multi-dimensional function fit, a Gaussian Mixture Model (GMM), and a Support Vector Machine (SVM), and retrieving, using the memory, the one or more cue information items associated with the limited spatial range, wherein the retrieving comprises retrieving the one or more cue information items by looking up the look-up table or by using the vector codebook, or by applying the multi-dimensional function fit, or by using the GMM or the SVM, or wherein the providing comprises providing one or more inter-channel correlation cue values as the one or more cue information items; and wherein the processing comprises generating, from the audio signal, a processed first channel and a processed second channel in such a way that the processed first channel and the processed second channel comprise an inter-channel correlation value as controlled by the one or more inter-channel correlation cue values, or wherein the providing comprises providing one or more cue information items for a plurality of different frequency bands, and wherein the processing comprises processing the audio signal in a spectral domain, wherein a cue information item for a band is applied to a plurality of spectral values of the audio signal in the band, or wherein the processing comprises either receiving a first audio channel and a second audio channel as the audio signal representing the spatially extended sound source, or receiving a first audio channel as the audio signal representing the spatially extending sound source and deriving the second audio channel by a second channel processor, wherein the first audio channel and the second audio channel are decorrelated with each other by a certain degree of decorrelation, wherein the providing comprises providing an inter-channel correlation value as the one or more cue information items, and wherein the processing comprises decreasing a correlation degree between the first channel and the second channel to the value indicated by the one or more inter-channel correlation cues provided, or wherein the receiving comprises: receiving a listener position as the spatial range indication; calculating a projection of a two-dimensional or three-dimensional hull associated with the spatially extended sound source onto a projection plane using, as the spatial range indication, the listener position and information on the spatially extended sound source, or calculating a two-dimensional or three-dimensional hull of a projection of a geometry of the spatially extended sound source onto a projection plane using, as the spatial range indication, the listener position and information on the spatially extended sound source; and determining the limited spatial range from hull projection data.

20. A non-transitory digital storage medium having a computer program stored there-on to perform, when said computer program is run by a computer, the method of synthesizing a spatially extended sound source, the method comprising:

receiving a spatial range indication indicating a limited spatial range for the spatially extended sound source within a maximum spatial range;

providing one or more cue information items in response to the limited spatial range; and processing an audio signal representing the spatially extended sound source using the one or more cue information items, wherein the providing comprises storing information on the one or more cue information items associated with a set of spaced candidate spatial ranges, the set of spaced limited spatial ranges covering the maximum spatial range, matching the limited spatial range to a candidate limited spatial range defining a candidate spatial range being closest to a specific limited spatial range defined by the limited spatial range and providing the one or more cue information items associated with the matched candidate limited spatial range, or wherein the limited spatial range comprises at least one of a pair of azimuth angles, a pair of elevation angles, an information on a horizontal distance, an information on a vertical distance, an information on an overall distance, and a pair of azimuth angles and a pair of elevation angles, or wherein the spatial range indication comprises a code identifying the limited spatial range as a specific sector of the maximum spatial range, wherein the maximum spatial range comprises a plurality of different sectors, or wherein the providing comprises using a memory for storing information on different cue information items in relation to different limited spatial ranges, wherein the memory comprises at least one of a look-up table, a vector codebook, a multi-dimensional function fit, a Gaussian Mixture Model (GMM), and a Support Vector Machine (SVM), and retrieving, using the memory, the one or more cue information items associated with the limited spatial range, wherein the retrieving comprises retrieving the one or more cue information items by looking up the look-up table or by using the vector codebook, or by applying the multi-dimensional function fit, or by using the GMM or the SVM, or wherein the providing comprises providing one or more inter-channel correlation cue values as the one or more cue information items; and wherein the processing comprises generating, from the audio signal, a processed first channel and a processed second channel in such a way that the processed first channel and the processed second channel comprise an inter-channel correlation value as controlled by the one or more inter-channel correlation cue values, or wherein the providing comprises providing one or more cue information items for a plurality of different frequency bands, and wherein the processing comprises processing the audio signal in a spectral domain, wherein a cue information item for a band is applied to a plurality of spectral values of the audio signal in the band, or wherein the processing comprises either receiving a first audio channel and a second audio channel as the audio signal representing the spatially extended sound source, or receiving a first audio channel as the audio signal representing the spatially extending sound source and deriving the second audio channel by a second channel processor, wherein the first audio channel and the second audio channel are decorrelated with each other by a certain degree of decorrelation, wherein the providing comprises providing an inter-channel correlation value as the one or more cue information items, and wherein the processing comprises decreasing a correlation degree between the first channel and the second channel to the value indicated by the one or more inter-channel correlation cues provided, or wherein the receiving comprises: receiving a listener position as the spatial range indication; calculating a projection of a two-dimensional or three-dimensional hull associated with the spatially extended sound source onto a projection plane using, as the spatial range indication, the listener position and information on the spatially extended sound source, or calculating a two-dimensional or three-dimensional hull of a projection of a geometry of the spatially extended sound source onto a projection plane using, as the spatial range indication, the listener position and information on the spatially extended sound source; and determining the limited spatial range from hull projection data.

* * * * *